(12) United States Patent
Tew et al.

(10) Patent No.: US 9,317,870 B2
(45) Date of Patent: *Apr. 19, 2016

(54) WORD RECOGNITION AND IDEOGRAPH OR IN-APP ADVERTISING SYSTEM

(71) Applicant: meemo, LLC, Blue Bell, PA (US)

(72) Inventors: Matthew Timothy Tew, Gainesville, GA (US); Jed Keith Corenthal, Westport, CT (US); Stephen Callahan Sterling, Cold Spring, NY (US); Christopher Ryan Nickless, Massillon, OH (US)

(73) Assignee: meemo, LLC, Westport, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/815,439

(22) Filed: Jul. 31, 2015

(65) Prior Publication Data
US 2015/0339706 A1 Nov. 26, 2015

Related U.S. Application Data

(63) Continuation of application No. 14/466,450, filed on Aug. 22, 2014, now Pat. No. 9,152,979, which is a continuation of application No. 14/071,372, filed on Nov. 4, 2013.

(51) Int. Cl.
G06F 15/16 (2006.01)
G06Q 30/02 (2012.01)
(Continued)

(52) U.S. Cl.
CPC .......... *G06Q 30/0251* (2013.01); *G06F 3/0482* (2013.01); *G06F 3/04817* (2013.01);
(Continued)

(58) Field of Classification Search
CPC ............. H04L 29/08072; H04L 29/06; G06Q 30/0251
USPC .................. 709/203, 220, 224, 227
See application file for complete search history.

(56) References Cited

U.S. PATENT DOCUMENTS 7,783,592 B2  8/2010  Armstrong et al.
7,831,204 B1  11/2010  Harvey et al.
(Continued)

FOREIGN PATENT DOCUMENTS

WO  WO 2007/058420  5/2007
WO  WO 2007/080570  7/2007
(Continued)

OTHER PUBLICATIONS

PCT/US2014/063689 PCT Written Opinion of the International Searching Authority, Mailed Mar. 5, 2015.
(Continued)

*Primary Examiner* — Khanh Dinh
(74) *Attorney, Agent, or Firm* — Dunlap Codding, P.C.

(57) ABSTRACT

A non-transitory processor readable medium storing processor executable instructions is described. The processor executable instructions, when executed by a processor, cause the processor to: receive application data indicative of text from a user device via a communications network; analyze the application data for one or more indicator being at least a portion of the text entered into the application and having one or more meaning; retrieve one or more selected ideograph from a database populated with ideographs received from and associated with one or more advertisers, the one or more selected ideograph being indicative of a graphical representation of the one or more meanings of the one or more indicator; transmit the one or more selected ideograph to the user device via the communications network; and charge a fee to at least one advertiser associated with the one or more selected ideograph.

23 Claims, 19 Drawing Sheets

(51) Int. Cl.
   *H04L 29/08*     (2006.01)
   *G06F 17/30*     (2006.01)
   *G06F 3/0482*    (2013.01)
   *G06F 3/0481*    (2013.01)
   *G06F 3/0484*    (2013.01)
   *H04L 29/06*     (2006.01)

(52) U.S. Cl.
   CPC ...... *G06F3/04842* (2013.01); *G06F 17/30876* (2013.01); *G06Q 30/0273* (2013.01); *H04L 29/06* (2013.01); *H04L 29/08072* (2013.01); *H04L 67/10* (2013.01)

(56) References Cited

U.S. PATENT DOCUMENTS

| | | | |
|---|---|---|---|
| 7,853,863 | B2 | 12/2010 | Sakai |
| 8,166,061 | B2 | 4/2012 | Armstrong et al. |
| 8,375,327 | B2 * | 2/2013 | Lorch ............... H04M 1/72555 715/810 |
| 8,504,586 | B2 | 8/2013 | Armstrong et al. |
| 8,588,825 | B2 | 11/2013 | Jonsson |
| 8,683,539 | B1 | 3/2014 | Harvey et al. |
| 8,973,034 | B1 * | 3/2015 | Harvey ................. G01R 1/071 725/35 |
| 9,152,979 | B2 * | 10/2015 | Tew ................... G06Q 30/0251 |
| 2006/0015812 | A1 | 1/2006 | Cunningham et al. |
| 2007/0174389 | A1 | 7/2007 | Armstrong et al. |
| 2007/0266090 | A1 | 11/2007 | Len |
| 2009/0043562 | A1 | 2/2009 | Peshave et al. |
| 2009/0124268 | A1 | 5/2009 | McNamara |
| 2010/0177116 | A1 | 7/2010 | Dahllof |
| 2010/0179991 | A1 | 7/2010 | Lorch et al. |
| 2010/0302254 | A1 | 12/2010 | Min |
| 2013/0103766 | A1 | 4/2013 | Gupta |
| 2013/0159919 | A1 | 6/2013 | Leydon |
| 2015/0156026 | A1 * | 6/2015 | Gault .................... H04L 9/3297 713/178 |

FOREIGN PATENT DOCUMENTS

| | | |
|---|---|---|
| WO | WO 2007/137408 | 12/2007 |
| WO | WO 2012/121555 | 9/2012 |
| WO | WO 2013/096482 | 6/2013 |
| WO | WO 2015/066610 | 7/2015 |

OTHER PUBLICATIONS

PCT/US2014/063689 PCT International Search Report, Mailed Mar. 5, 2015.
Office Acton for U.S. Appl. No. 14/071,372 dated Jan. 6, 2016, 78 pgs.

* cited by examiner

WORD RECOGNITION AND IDEOGRAPH OR IN-APP ADVERTISING SYSTEM

INCORPORATION BY REFERENCE/CROSS REFERENCE TO RELATED APPLICATIONS

The present patent application is a continuation of U.S. Ser. No. 14/466,450, which was filed on Aug. 22, 2014, which is a continuation of U.S. Ser. No. 14/071,372, which was filed on Nov. 4, 2013, the entire content of which is hereby incorporated herein by reference.

BACKGROUND

Communication applications, such as email, text messaging applications, social networking applications, and the like are widely available on mobile devices and other computer systems. These communication applications are largely text based, allowing a user to type a text, message, or letter for transmission to another user in order to communicate. An ideograph is a graphic character used for the meaning of a thing, rather than a word. Communication applications have been augmented to convey emotion in a number of ways. Emoticons are a type of ideograph in which a text based pictorial was used as a representation of a facial expression to convey tone or emotion within a text based message. Emojis are another type of ideograph used in electronic communication to convey tone or emotions which appear inline in a communication. Digital "stickers" are yet another type of ideograph, but often appears out of the normal line of text in an electronic communication. Emoticons, emojis, and stickers may be animated or non-animated. In some applications, "packs" of multiple ideographs are offered to users and presented as long strings of characters which, once selected by a user, are inserted as the desired ideograph. However, the character strings may be difficult to remember and prone to confusion as there are no standards among chat platforms and communication applications for character strings used to insert certain ideographs. Ideographs may also be placed in menus of these communication applications or may be ported into a communication application from another application on the computing system. In order to include ideographs in text communications, the user may be forced to search a large library of emojis/emoticons/stickers, choose the ideograph that best represents the emotion or feeling the user wishes to convey, and then enter the ideograph into the text communication.

It is difficult in any communication application whether it be mobile, tablet, desktop, or web, for users to quickly locate ideographs, such as emoji, emoticons, or stickers, to include in a text or chat while remaining within the application in order to quickly and accurately represent and convey a specified emotion or concept. Therefore, it would be beneficial to have a software technology system which can recognize words and automatically suggest ideographs suitable to replace the word or suitable for insertion into a message containing the word.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one embodiment a non-transitory processor readable medium is described having processor executable instructions that when executed by a processor cause the processor to monitor application data from a user device via a communications network, analyze the application data for one or more indicator(s), retrieve one or more ideograph indicative of a graphical representation of one or more meaning of the one or more indicator(s), and transmit the one or more ideograph to the user device via a communications network. The application data is indicative of text entered into an application by a user via the user device. The one or more indicator(s) is at least one word or a portion of the text entered into the application and has one or more meaning(s). The application data may include the word "happy." This word is an indicator that the user of the user device is conveying that they or someone is in a good mood. One or more ideograph, such as a smiley face, may be automatically retrieved and entered into the application data. The one or more ideograph is retrieved without immediate user action beyond entering the descriptive text into the application.

In another embodiment a mobile device is described with a processor, an input device, and a non-transitory processor readable medium storing processor executable instructions that when executed cause the processor to receive data indicative of text entered into an application by the input device, analyze the data for one or more indicator(s), retrieve one or more ideograph graphically, representing one or more meaning(s) of the one or more indicator(s), and display at least a portion of the text and the one or more ideograph to the user in the application. The application is stored on the non-transitory processor readable medium. The one or more indicator is at least a portion of the text entered into the application and has one or more meanings. The one or more ideograph is retrieved without requiring immediate user action beyond entering the text into the application.

In another version, a mobile device is described as having a processor configured to access a database, an input device coupled to the processor, an output device coupled to the processor, a communications device coupled to the processor, and a non-transitory processor readable medium coupled to the processor. The input device is configured to receive data from a user and pass the data to the processor. The output device is configured to transmit data received from the processor to a user in a user perceivable format. The communications device is configured to transmit information from a communications network to the processor and transmit information from the processor to the communications network. The non-transitory processor readable medium stores processor executable instructions that when executed cause the processor to receive data indicative of text entered into an application by the input device, analyze the data for one or more indicator(s), retrieve one or more ideograph graphically representing one or more meaning of the one or more indicator(s), and display at least a portion of the text and the one or more ideograph to the user via the output device. The application is stored on the non-transitory processor readable medium. The one or more indicator is at least a portion of the text entered into the application and has one or more meanings. The one or more ideograph is retrieved without immediate user action beyond entering the text into the application.

In another embodiment, a non-transitory processor readable medium is described having processor executable instructions that when executed by a processor cause the processor to receive one or more branded visual content from one or more advertiser, monitor application data received from a user device via a communications network, analyze the application data for one or more indicator, retrieve one or more of the one or more branded visual content representative of the one or more meanings of the one or more indicator(s), and transmit the branded visual content to the user device via the communications network. The application data is indicative of text entered into an application by a user via the user device. The one or more indicator is at least a portion of the text entered into the application, and the one or more indicator has one or more meaning.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein.

FIGS. 4-1 through 4-8 depict exemplary screenshots generated by a user device executing one embodiment of the word recognition and ideograph insertion program in accordance with the inventive concepts disclosed herein:

FIG. 4-1 is an embodiment of a mobile device having a processor executing a word recognition and ideograph insertion program, a messaging application, and a pop-up window of the word recognition and ideograph insertion program having ideographs to be inserted into application data entered into the messaging application;

FIG. 4-2 is an embodiment of the mobile device having a processor executing the messaging application of FIG. 4-1 with a selected ideograph inserted into the application data;

FIG. 4-3 is an embodiment of the mobile device having a processor executing another version of a word recognition and ideograph insertion program, a messaging application, and a pop-up window of the word recognition and ideograph insertion program having ideographs to be inserted into application data and an icon for selecting a position of a selected ideograph within the application data entered into the messaging application;

FIG. 4-4 is an embodiment of the mobile device having a processor executing the messaging application of FIG. 4-3 with the selected ideograph inserted into the application data in a desired location;

FIG. 4-5 is another embodiment of a mobile device having a processor executing a word recognition and ideograph insertion program, a messaging application, and a pop-up window of the word recognition and ideograph insertion program having ideographs to be inserted into application data and an icon for selecting a position of the selected ideograph within the application data entered into the messaging application;

FIG. 4-6 is an embodiment of the mobile device having a processor executing the messaging application of FIG. 4-5 with the selected ideograph inserted into the application data in a desired location;

FIG. 4-7 is an embodiment of a mobile device having a processor executing a word recognition and ideograph insertion program, a messaging application, and a pop-up window of the word recognition and ideograph insertion program having ideographs to be inserted into application data entered into the messaging application; and FIG. 4-8 is an embodiment of the mobile device having a processor executing the messaging application of FIG. 4-7 with the ideograph replacing the application data.

FIG. 5 is a block diagram of some embodiments of the execution of processor executable instructions stored on a non-transitory processor readable medium forming a word recognition and ideograph insertion program in accordance with the inventive concepts disclosed herein.

FIG. 6-1 through 6-8 depict exemplary screenshots generated by a user device executing one embodiment of a word recognition and advertising insertion program in accordance with the inventive concepts disclosed herein:

FIG. 6-1 is an embodiment of a mobile device having a processor executing an embodiment of a word recognition and advertising insertion program, a messaging application, and a display of the word recognition and advertising insertion program having a single advertiser and single branded visual content to be inserted into application data entered into the messaging application;

FIG. 6-2 is an embodiment of the mobile device having a processor executing the messaging application of FIG. 6-1 with a selected branded visual content from a single advertiser appended to the application data;

FIG. 6-3 is an embodiment of the mobile device having a processor executing another version of a word recognition and advertising insertion program, a messaging application, and the word recognition and advertising insertion program presenting a digital sticker icon indicative of a digital sticker set from a single advertiser;

FIG. 6-4 is an embodiment of the mobile device having a processor executing the messaging application of FIG. 6-3 with branded visual content of the digital sticker set of the single advertiser displayed;

FIG. 6-5 is another embodiment of a mobile device having a processor executing an embodiment of a word recognition and advertising insertion program, a messaging application, and the word recognition and advertising insertion program presenting a digital sticker icon indicative of a plurality of sponsored digital sticker sets from a plurality of advertisers;

FIG. 6-6 is an embodiment of the mobile device having a processor executing the messaging application of FIG. 6-5 with branded visual content of the plurality of sponsored digital sticker sets from the plurality of advertisers displayed;

FIG. 6-7 is an embodiment of a mobile device having a processor executing a word recognition and advertising insertion program, a messaging application, and the word recognition and advertising insertion program identifying an indicator within application data entered into the messaging application; and FIG. 6-8 is an embodiment of the mobile device having a processor executing the messaging application of FIG. 6-7 with branded visual content graphically representative of the indicator appended to the application data without user interaction.

DETAILED DESCRIPTION

Figure 1:
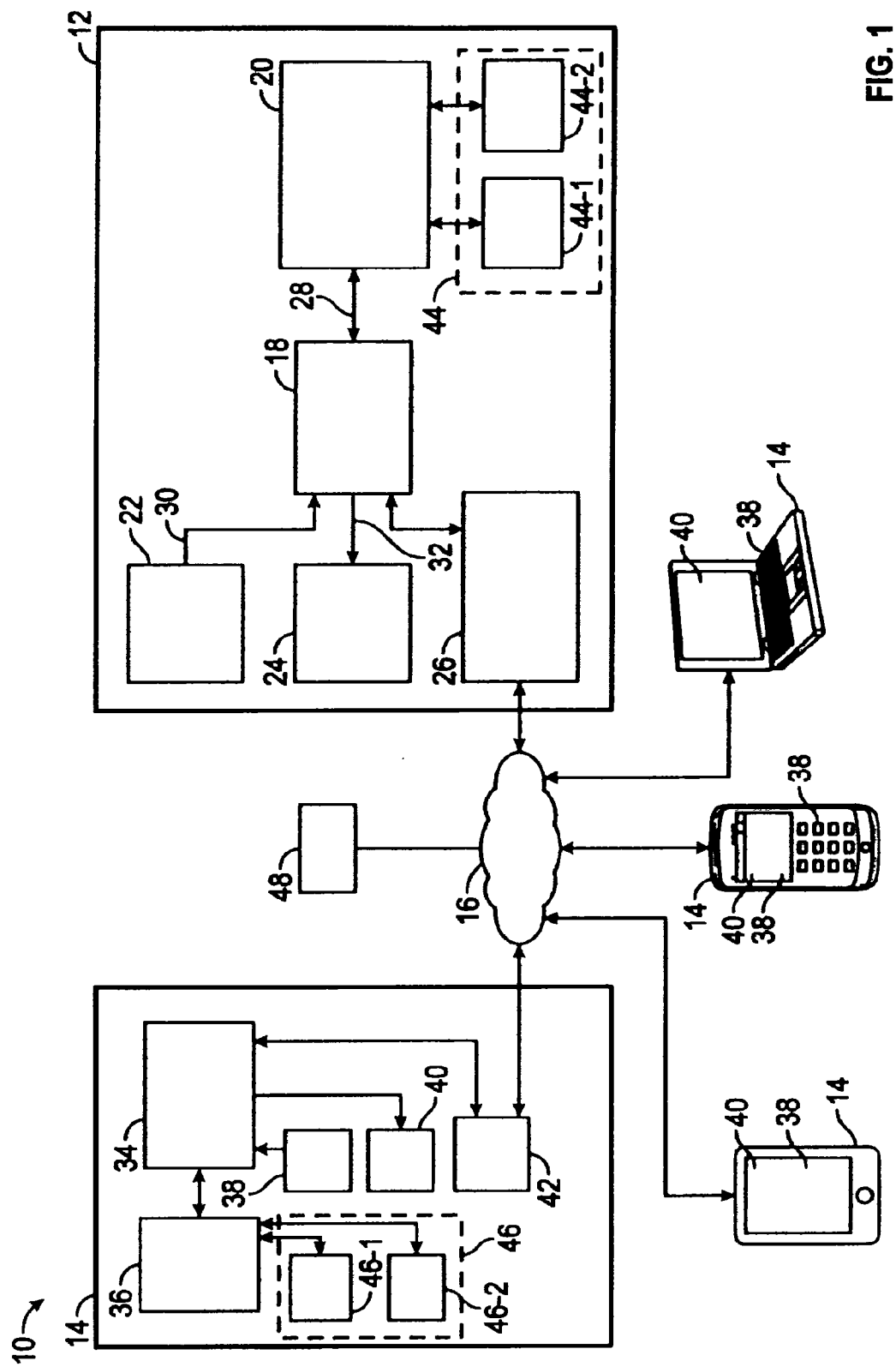
FIG. 1 is a schematic depiction of a word recognition and ideograph insertion system constructed in accordance with the present disclosure.

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Finally, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

The inventive concepts disclosed herein are generally directed to a word recognition and ideograph insertion system, which may allow insertion of specific emojis, emoticons, digital stickers, or other media, in place of corresponding words or messages, of application data as a user is typing the application data into an application in the form of chat, text, email, or the like. The words may correspond to human emotions (i.e. happy, sad, angry, etc.), commercial items (i.e. coffee, food, etc), commercial services, or other words able to be represented by ideographs, such as digital images, emojis, emoticons, or stickers. As the words are typed, a selection of corresponding ideographs (e.g. smiley faces, frowny faces, animated faces, characters, licensed images, product icons, advertising icons, etc.) may be offered, automatically or otherwise, to the user as a replacement therefor or in addition thereto. This may enable chat, text, or email to be more interactive, emotive, or better carry tone and context. This may also enable communications between two users to be used as an advertising media for businesses and as a revenue stream for message platforms, telecommunications providers, and the like from advertisers offering branded visual content for use in these communications. In one embodiment, the present disclosure may describe a computer based system configured to receive or monitor application data from one or more user device, analyze the data for one or more indicator, retrieve one or more ideograph indicative of a graphical representation of one or more meaning of the one or more indicator, and transmit the one or more ideograph to the user device. The word recognition and ideograph insertion system may also cause the user device to display at least a portion of the data and the one or more ideograph including, but not limited to, one or more branded visual content and provide for selection of the one or more ideograph for insertion into the application data. In another embodiment, the present disclosure may describe an ideograph insertion system capable of inserting advertising images or material into user communications, evaluate user engagement with the advertising material, the user's acceptance or exposure to the advertising material, an overall advertising campaign performance, and other metrics described below.

Referring now to FIG. 1, one embodiment of a word recognition and ideograph or in-app advertising system 10 is shown according to the inventive concepts disclosed herein. In one embodiment, the word recognition and ideograph or in-app advertising system 10 may comprise one or more computer system 12 and one or more mobile device 14 (also referred to hereinafter as a user device). The one or more computer system 12 and the one or more mobile device 14 may communicate/interface via a communications network 16. In general terms, the one or more computer system 12 may be implemented as any desired computer system and may include a host system, one or more web server hosting one or more web site, or a stand-alone computer system, for example. The user device 14 may be any mobile or stationary computing device, such as a smartphone, a laptop, a desktop computer, a netbook, a tablet computer (such as an iPad, for example), a personal digital assistant (PDA), or other computing device, for example. The network 16 may be any desired network, such as the internet, a local area network, a wide area network, an optical network, a wireless network, a cellular network, a public telephone network, a circuit switched network, a packet switched network, a datagram network, a virtual circuit network, a satellite network, a 3G network, a 4G network, an LTE network, a metropolitan network, a bluetooth network, or combinations thereof, for example.

The one or more computer system 12 may comprise one or more personal computers, mainframe computers, servers, web servers, local servers, internet servers, virtual servers, distributed servers, distributed computer networks, and combinations thereof. In one embodiment, the one or more computer system 12 may have at least one processor 18 capable of executing processor executable instructions, a non-transitory processor readable medium 20 capable of storing processor executable instructions, an input device 22, an output device 24, and a communications device 26, all of which may be partially or completely network-based or cloud based, and may not necessarily be located in a single physical location. The one or more computer system 12 may be hosted on the network 16, in some embodiments, or may be operably coupled with the network 16.

The processor 18 can be implemented as a single processor or multiple processors working together to execute processor executable instructions including the logic described herein. Exemplary embodiments of the processor 18 may include a digital signal processor (DSP), a central processing unit (CPU), a field programmable gate array (FPGA), a microprocessor, a multi-core processor, a quantum processor, application-specific integrated circuit (ASIC), a graphics processing unit (GPU), a visual processing unit (VPU) and combinations thereof. The processor 18 is operably coupled with the non-transitory processor readable medium 20 via a path 28 which can be implemented as a data bus allowing bi-directional communication between the processor 18 and the non-transitory processor readable medium 20, for example. The processor 18 is capable of communicating with the input device 22 and with the output device 24 via paths 30 and 32, which may be one or more data busses, for example. The processor 18 may be further capable of interfacing and/or bi-directionally communicating with the user device 14 via the network 16 using the communications device 26, such as by exchanging electronic, digital, analogue, and/or optical signals via one or more physical, virtual, or logical ports using any desired network protocol such as TCP/IP, for example. It is to be understood that in certain embodiments using more than one processor 18, multiple processors may be located remotely from one another, located in the same location, or comprising a unitary multi-core processor (not shown). The processor 18 is capable of reading and/or executing processor executable code stored in the one or more non-transitory processor readable medium 20 and/or of creating, manipulating, altering, and storing computer data structures into the one or more non-transitory processor readable medium 20.

The non-transitory processor readable medium 20 may store a word recognition and ideograph insertion program having processor executable instructions. The non-transitory processor readable medium 20 may be implemented as any type of memory, such as random access memory (RAM), a CD-ROM, a hard drive, a solid state drive, a flash drive, a memory card, a DVD-ROM, a floppy disk, an optical drive, and combinations thereof, for example. While the non-transitory processor readable medium 20 may be located in the same physical location as the processor 18, the non-transitory processor readable medium 20 may also be located remotely from the processor 18 and may communicate with the processor 18 via the network 16. Additionally, when more than one non-transitory processor readable medium 20 is used, one or more non-transitory processor readable medium 20 may be located in the same physical location as the processor 18, and one or more non-transitory processor readable medium 20 may be located in a remote physical location from the processor 18. The physical location of the non-transitory processor readable medium 20 can be varied, and the non-transitory processor readable medium 20 may be implemented as a "cloud memory" i. e., one or more non-transitory processor readable medium 20 which is partially, or completely based on or accessed using the network 16, for example. Further, the one or more processor 18 may not communicate directly with the non-transitory processor readable medium 20, but may communicate with another processor 18 communicating with the non-transitory processor readable medium 20 over the network 16, for example. In some exemplary embodiments, the processor 18 may include a first processor communicating with a second processor executing processor executable instructions including the word recognition and ideograph insertion program over the network 16. The second processor 18 may be part of a computer station (not shown), or may be a part of a separate computer system or server configured to communicate with the computer system 12 over the network 16 or otherwise operably coupled with the computer system 12, for example.

The input device 22 may pass data to the processor 18, and may be implemented as a keyboard, a mouse, a touch-screen, a camera, a cellular phone, a tablet, a smart phone, a personal digital assistant (PDA), a microphone, a network adapter, and combinations thereof, for example. The input device 22 may also be implemented as a stylus, a mouse, a trackball, and combinations thereof, for example. The input device 22 may be located in the same physical location as the processor 18, or may be remotely located and/or partially or completely network-based.

The output device 24 passes information from the processor 18 to a user in a user perceivable format. For example, the output device 24 can be implemented as a server, a computer monitor, a cell phone, a smartphone, a tablet, a speaker, a website, a PDA, a fax, a printer, a projector, a laptop monitor, and combinations thereof. The term "pass" as used herein may refer to either push technology, or to pull technology, and to combinations thereof. The output device 24 can be physically co-located with the processor 18, or can be located remotely from the processor 18, and may be partially or completely network based (e.g., a website). The output device 24 communicates with the processor 18. As used herein the term "user" is not limited to a human, and may comprise a human, a computer, a host system, a smart phone, a tablet, and combinations thereof, for example.

The user device 14 may be connected or otherwise operably coupled with the network 16, and can be implemented as a smartphone, a tablet, a laptop computer, a personal computer, a desktop computer, a computer terminal, a computer workstation, an e-book reader, a wireless network-capable handheld device, a digital video recorder, a personal digital assistant, or combinations thereof, for example. Similar to the computer system 12, described above, in one embodiment, the user device 14 may be provided with one or more processor 34, one or more non-transitory processor readable medium 36, an input device 38, an output device 40, and a communications device 42. The processor 34, the one or more non-transitory processor readable medium 36, the input device 38, the output device 40, and the communications device 42 of the user device 14 may be implemented similarly to or the same as the processor 18, the one or more non-transitory processor readable medium 20, the input device 22, the output device 24, and the communications device 26, respectively. The user device 14 may be capable of interfacing with the network 16, via a wireless or wired interface. The one or more non-transitory processor readable medium of the user device may store processor executable instructions or software applications, and a web browser or a smartphone application (e.g., native software application running on a user device and configured to communicate with a web server over a computer network) running on the user device 14 and capable of accessing a website and/or communicating information and/or data with a web server such as the computer system 12 over a network, such as the network 16.

The network 16 may be implemented as a wireless and/or wired network 16 (e.g., the world wide web or Internet, or any other computer network configured to allow bidirectional exchange of data and/or signals between computer processors), and may permit bi-directional communication of information and/or data between the computer system 12 and/or one or more user device 14 operably coupled with the network 16, for example.

The network 16 may interface with the computer system 12 and with the user device 14 operably coupled with the network 16 in a variety of ways, such as by optical, wireless, wired, and/or electronic interfaces, and may use a plurality of network topographies and protocols, such as Ethernet, TCP/IP, circuit switched paths, and combinations thereof, for example. The network 16 may use a variety of network protocols to permit bi-directional interface and communication of data and/or information between the computer system 12 and the user device 14 operably coupled with the network 16. In some embodiments, the network 16 may be secured using any desired secured networking protocol, such as a gateway server, a firewall, data encryption, public or private key cryptography infrastructure, secure socket layer protocol, hypertext transfer protocol secure, a virtual private network, a tunnel, secure shell, and any combinations thereof, for example.

The one or more computer system 12 may include processor executable instructions 44 and the user device 14 may also include processor executable instructions 46. The processor executable instructions 44 which may comprise one or more computer program having processor executable instructions written in any suitable programming language, such as C++, C#, Java, Python, Perl, Binary, assembly language, or other high or low level programming language for example. A computer program for the word recognition and ideograph or in-app advertising system 10 on the computer system 12 or the user device 14 may be implemented as processor executable instructions, software, firmware, or a combination of software and firmware, for example, and may be at least partially stored in the non-transitory processor readable medium 20 or 36, respectively. The computer system 12 or user device 14 may access and execute the processor executable instructions 44 or 46, respectively, to execute at least a portion of the functions of the word recognition and ideograph or in-app advertising system 10. For example, the computer system 12 may execute the processor executable instructions 44 for a portion of the functions of the word recognition and ideograph or in-app advertising system 10 and the one or more user device 14 may execute the processor executable instructions 46 to perform a remaining portion of the functions of the word recognition and ideograph or in-app advertising system 10. In some embodiments, the entirety of the processor executable instructions which performs the functions of the word recognition and ideograph or in-app advertising system 10 may be stored on either the non-transitory processor readable medium 20 of the computer system 12 or the non-transitory processor readable medium 36 of the user device 14.

In one embodiment, the processor executable instructions 44 includes a word recognition and ideograph insertion program 44-1 and other processor executable instructions 44-2 such as an operating system and application programs such as a word processor, spreadsheet program, email program, or text communication program, for example. In some embodiments, the other processor executable instructions 44-2 may include a word recognition and advertising insertion program 44-2, as will be described in more detail below. The processor executable instructions for the word recognition and ideograph insertion program 44-1 and the other processor executable instructions 44-2 may be written in any suitable high level or low level programming language as described above. Similarly, in one embodiment, the processor executable instructions 46 stored on the user device 14 may include a word recognition and ideograph insertion program 46-1 and other processor executable instructions 46-2. The other processor executable instructions 46-2 may be implemented similarly to the other processor executable instructions 44-2. The word recognition and ideograph insertion programs 44-1 and 46-2 may work in concert or independently to perform the functions of the word recognition and ideograph or in-app advertising system 10 described below in more detail. For example, the word recognition and ideograph insertion programs 44-1 and 46-1 may be implemented as a single application, which may be stored on either the computer system 12, the user device 14, or both, such that the word recognition and ideograph insertion programs 44-1 and 46-1 perform the functions of the word recognition and ideograph or in-app advertising system 10 on either or both of the computer system 12 and the user device 14. As an additional example, the word recognition and ideograph insertion programs 44-1 and 46-1 may be implemented as separate applications, where the word recognition and ideograph insertion program 44-1 is stored on the computer system 12 and the word recognition and ideograph insertion program 46-1 is stored on the user device 14. Similarly, the word recognition and advertising insertion program 44-2 may work in concert and/or independently from the word recognition and ideograph insertion program 44-1 and 46-1, as well as in concert and/or independently from the other processor executable instructions 46-2. The word recognition and advertising insertion program 44-2 may also be implemented, similarly to the word recognition and advertising insertion program 44-1, as a single application with the word recognition and ideograph insertion programs 44-1 and/or 46-1 such that the word recognition and advertising insertion program 44-2 may perform the functions of another embodiment of a word recognition and ideograph or in-app advertising system 10-1, as will be described in more detail below.

In one embodiment, the computer system 12 and the user device 14 may further include or have access to a database 48 having a plurality of indicators and a plurality of ideographs linked to form relationships between certain of the plurality of indicators and certain of the plurality of ideographs, as will be explained in more detail below. The database 48 may be implemented as any desired non-transitory processor readable medium configured to store processor executable instructions and/or data, for example. The database 48 may be operably coupled with the processor 18 and/or the processor 34 (e.g., directly or via the network 16) so that the database 48 and the processor 18 or 34 may exchange data and/or signals bi-directionally with one another. It is to be understood that in some exemplary embodiments, the database 48 may be implemented as a part of the non-transitory processor readable medium 20 where implemented within the computer system 12 or as part of the non-transitory processor readable medium 36 where implemented within the user device 14. In some other embodiments, the database 48 may be implemented and located at a separate physical location from the word recognition and ideograph or in-app advertising system 10 and may be operably coupled to the processor 18 or 34 via the network 16.

Figure 2:
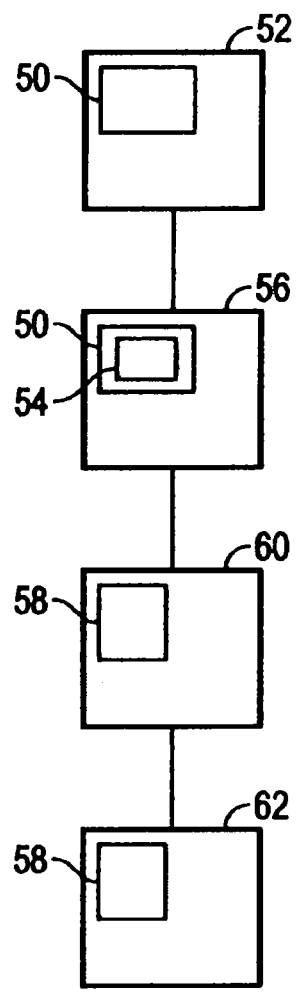
FIG. 2 is a block diagram of one embodiment of the execution of processor executable instructions stored on a non-transitory processor readable medium forming a word recognition and ideograph insertion program in accordance with the inventive concepts disclosed herein.

Referring now to FIG. 2, therein shown is block diagram of one embodiment of the word recognition and ideograph insertion program 44-1. As previously discussed, at least a portion of the word recognition and ideograph insertion program 44-1 may be stored on the one or more non-transitory processor readable medium 20 of the computer system 12. In one embodiment, when executed, the word recognition and ideograph insertion program 44-1 may cause the one or more processor 18 to monitor application data 50 from the user device 14 via the communications network 16, as indicated by block 52. The word recognition and ideograph insertion program 44-1 may further cause the processor 18 to analyze the application data for one or more indicator 54 within the application data 50, as indicated by block 56. The processor 18 may then retrieve one or more ideograph 58 indicative of a graphical representation of the one or more meanings of the one or more indicator 54, as indicated by block 60. The processor 18 may then transmit the one or more ideograph 58 to the user device 14 via the communications network 16, as indicated by block 62.

The application data 50 may be indicative of text entered into an application by a user via the user device 14. For example, the application data 50 may be a text string entered into a smartphone on a text messaging application or email application, stored on the non-transitory processor readable medium 36 of the user device 14. The one or more indicator 54, identified within the application data 50 by the processor 18, may be at least a portion of the text entered into the application and may have one or more meaning. In some embodiments, the one or more meaning may be an emotional denotation or connotation. In some embodiments, the processor 18 may determine the one or more meaning of the one or more indicator 54 from the database 48 from the relations between the plurality of indicators and the plurality of ideographs stored on the database 48. The processor 18 may also determine meaning from internal or external dictionaries, or other suitable methods.

The one or more ideograph 58 may be a pictorial representation of the one or more indicator 54 or the one or more meaning of the one or more indicator 54 for which the one or more ideograph 58 is indicative. In some embodiments, the one or more ideograph 58 is a non-textual graphic, such as an emoticon, emoji, sticker, image, video, series of images, .gif, animations, sounds, sound recordings, video with sound, other media, or combination thereof, for example. In some embodiments, the one or more ideograph 58 may include one or more branded visual content such as product icons, licensed images, advertising icons, slogans, trademarks, and/or other images, emoticons, emoji, stickers, video, .gif, animations, sounds, sound recordings, video with sound, jingles, other media, and/or combinations thereof, for example. However, it should be understood that the one or more ideograph 58 may be any ideograph conveying at least one of the one or more meaning of the one or more indicator 54 and/or providing context or tone clues to the application data 50. For example, when the one or more indicator 54 in the application data 50 is the textual word "coffee," the one or more ideograph 58 may be presented as a coffee cup, a mug with coffee, a coffee bean, or other similar images indicative of the word and/or contextual meaning for coffee within the application data 50. It should also be understood that, in addition to general meanings, the one or more indicator 54 may be replaced by branded visual content where the one or more indicator 54 specifically references, refers to, or implicates the content. For example, where the one or more indicator 54 is the name of a company, a company's product, or other similar word, the one or more ideograph 58 acting as a pictorial representation of that one or more indicator 54 may be a graphic of a trademark for the company or company product. The one or more ideograph 58 may be retrieved from the database 48, from the communications network 16, from the one or more non-transitory processor readable medium 36 of the user device 14, from the one or more non-transitory processor readable medium 20 of the computer system 12, from combinations thereof, or from any other suitable source of ideographs accessible to the computer system 12. The one or more ideograph 58 may be retrieved without immediate user action beyond entering the text into the application. For example, upon entering the application data 50 into the application, the processor 18 may analyze the application data 50 for the one or more indicator 54 and retrieve one or more ideograph 58 indicative of the meaning of the one or more indicator 54 automatically in response to entering the one or more indicator 54 into the application. By way of another example, the processor 18 may be prompted to retrieve one or more ideograph 58 for the one or more indicator 54 entered into the application where the application determines that the one or more indicator 54 has one or more meaning representable by a graphic. The term "immediate" as used herein refers to a time period in which the user is entering the application data 50 into the application. Non-immediate user action may be used to set up or enable the word recognition and ideograph insertion program 44-1, configure custom associations between the one or more ideograph 58 and the one or more indicator 54, or initiate the application into which the application data 50 is entered, for example.

Figure 3:
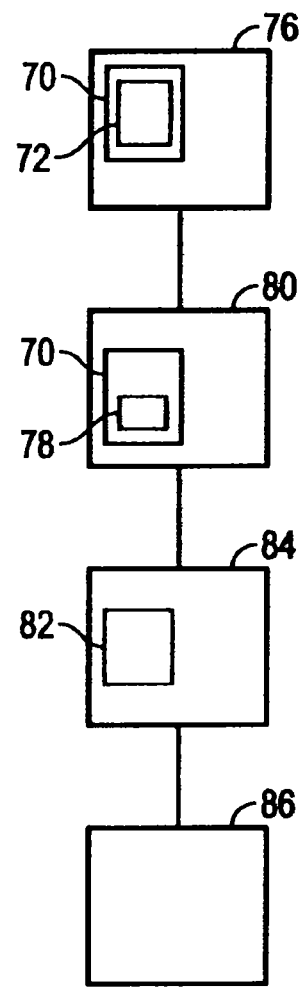
FIG. 3 is a block diagram of another embodiment of the execution of processor executable instructions stored on a non-transitory processor readable medium forming the word recognition and ideograph insertion software program in accordance with the inventive concepts disclosed herein.

Referring now to FIG. 3 and generally to FIGS. 4-1-4-8, therein shown is another representation of an embodiment of the word recognition and ideograph insertion program 46-1. When executed, the word recognition and ideograph insertion program 46-1 may cause the processor 34 to receive data 70 indicative of text 72 entered into an application 74 by the input device 38, as indicated by block 76. The text 72 may be a text stream entered into the application 74. The application 74 may be stored on the one or more non-transitory processor readable medium 36. The processor 34 may then analyze the data 70 for one or more indicator 78, as indicated by block 80. The processor 34 may then retrieve one or more ideograph 82 indicative of a graphical representation of the one or more meanings of the one or more indicator 78, as indicated by block 84. The processor 34 may then display at least a portion of the text 72 and the one or more ideograph 82 to the user in the application 74, as indicated by block 86.

The one or more indicator 78 may be at least a portion of the text 72 entered into the application 74. The one or more indicator 78 may have one or more meanings, which in some embodiments may be one or more emotional denotations or connotations such as happy, sad, angry, or the like, for example. In some embodiments, the processor 34 may determine the one or more meaning of the one or more indicator 78 from the database 48, from the relations between the plurality of indicators and the plurality of ideograph stored on the database 48. The processor 34 may also determine the one or more meaning from internal or external dictionaries, or other suitable methods such as a data table forming links from particular words or phrases to particular ideographs, for example.

As previously discussed, the one or more ideograph 82 may be a pictorial representation of the one or more indicator 78 or the one or more meaning of the one or more indicator 78 and may be associated with the one or more indicator 78 and one or more meaning by the relational tags. In some embodiments, the one or more ideograph 82 is a non-textual graphic, such as an emoticon, emoji, sticker, image, video, series of images, .gif, other media, or combination thereof, for example. In some embodiments, the one or more ideograph 82 may include one or more branded visual content such as product icons, licensed images, advertising icons, slogans, trademarks, and/or other images, emoticons, emoji, stickers, video, .gif, other media, and/or combinations thereof, for example. However, it should be understood that the one or more ideograph 82 may be any media conveying at least one of the one or more meaning of the one or more indicator 78 and/or providing context or tone clues to the data 70.

In analyzing the data 70, the processor 34 may pass the data 70 to an application programming interface (API), a software development kit (SDK), or other interface. The interface may be included in the database 48, stored on the non-transitory processor readable medium 20, stored on the non-transitory processor readable medium 36, or accessible via the communications network 16. The interface may search for the one or more indicator 78, for example by searching the data 70 for keywords such as the one or more indicator 78. Once one or more indicator 78 has been found within the data 70, the interface may further search for any corresponding words or emotions related to the one or more indicator 78 located within the data 70 which may be suitable for graphical representation by the one or more ideograph. For example, if a user inputs a first indicator 78-1 "smile", the first indicator 78-1 would be passed to the interface and associated indicators 78-2, which may have a relationship to the first indicator 78-1, such as "happy," "pleased," "grin," and "delighted" would also be collected. The processor 34 may then search for the one or more corresponding ideograph 82 based on one or more relational tags associated with the one or more ideograph 82 and indicative of a relationship between certain of the one or more indicator 78 and the one or more ideograph 82.

The one or more relational tags may be words associated with the one or more ideograph 82 within the database 48, the non-transitory processor readable medium 20, or the non-transitory processor readable medium 36 where the one or more ideograph 82 are stored. For example, where the one or more ideograph 82 is a heart, the relational tags may include love, like, heart, affection, amity, ardor, cherish, crush, lust, passion, and other words related to or depicted by the heart. It should be understood that the word recognition and ideograph insertion program 46-1 may be able to weight certain factors in analyzing and selecting the one or more ideograph 82 to be displayed. For example, the word recognition and ideograph insertion program 46-1 may weight tense, context, word placement, alternative spellings, and the like to appropriately select the one or more ideograph 82. Further, the word recognition and ideograph insertion program 46-1 may enable the user to add additional relational tags, remove relational tags, or include additional ideograph(s) to existing relational tags. In certain embodiments, the relational tags may also include a brand, a character, a trademark, onomatopoeia, or other suitable words or phrases. In this case, the user may enter a desired relational tag, such as the name of an athlete or a sports franchise, into the application 74, and receive one or more ideograph 82 indicative of the desired relational tag. In this embodiment, the relational tags may be used similar to an in-application image search function to automatically populate messages, email, and the like, with multi-media content without leaving the application to search for the content.

The one or more ideograph 82 may be retrieved without immediate user action beyond entering the text 72 into the application 74, as discussed above. For example, upon entering the data 70 into the application, the processor 34 may analyze the data 70 for the one or more indicator 78 and the retrieve one or more ideograph 82 indicative of the meaning of the one or more indicator 78 automatically in response to entering the one or more indicator 78 into the application 74. By way of another example, in some embodiments, the processor 34 may also prompt the user to select the one or more ideograph 82 for the one or more indicator 78 once multiple ideograph 82 have been retrieved and the ideograph 82 entered into the application 74 where the processor 34 determines that the one or more indicator 78 has one or more meaning representable by a graphic. In one embodiment, the processor 34 may retrieve the one or more ideograph 82 from the database 48, where the one or more indicator 78 is included in the plurality of indicators within the database 48 and the one or more ideograph 82 is included in the plurality of ideograph 82. Retrieving the one or more ideograph 82 from the database 48 may be performed, as described above, where the processor 34 or the interface searches the database 48 for the one or more ideograph 82 linked to the one or more indicator 78, by the relational tags, and retrieves the one or more ideograph 82 resulting from the search of the database 48. The one or more ideograph 82 may also be retrieved via the communications network 16, from the one or more non-transitory processor readable medium 36 of the user device 14, from the one or more non-transitory processor readable medium 20 of the computer system 12, from combinations thereof, or from any other suitable source of media accessible to the user device 14.

Referring now to FIGS. 4-1-4-8, the processor 34 may display the one or more ideograph 82 within the application 74, in a pop-up window 92 (as shown in FIGS. 4-1, 4-3, 4-5, and 4-7) overlaying the application 74, in a separate application, or any other suitable method. In the embodiment shown in FIGS. 4-1, 4-3, and 4-5, a plurality of ideograph 82 have been retrieved for the indicator 78 "love". The plurality of ideographs 82 is displayed in the pop-up window 92 overlaying at least a portion of a displayed portion of the application 74. The user may close the pop-up window 92 by selecting an icon 94, shown as an "X". In other embodiments, the user may close the pop-up window 92 by touching, clicking with a mouse or track ball, continuing to type in the application, or otherwise selecting or indicating another area of the display of the application 74. In still other embodiments, the user may close the pop-up window 92 via keyboard, mouse, or other input device, as described in more detail above in relation to the input device 22.

Figures 1, 4:
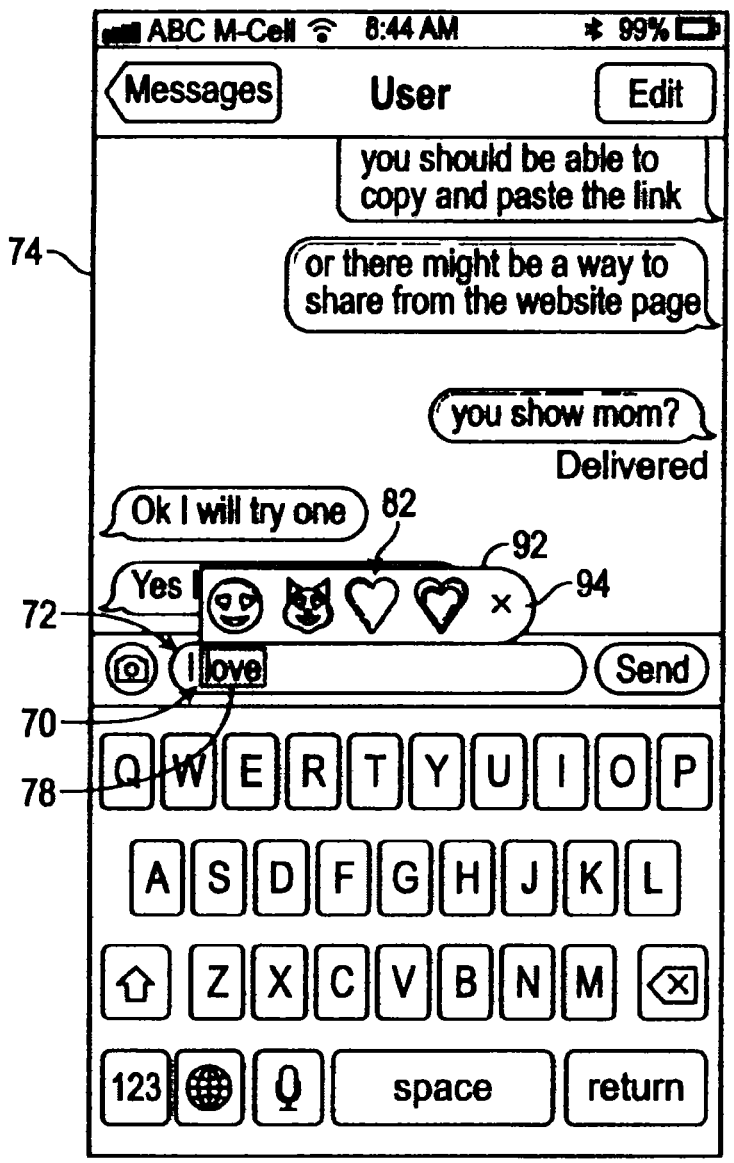
Figures 2, 4:
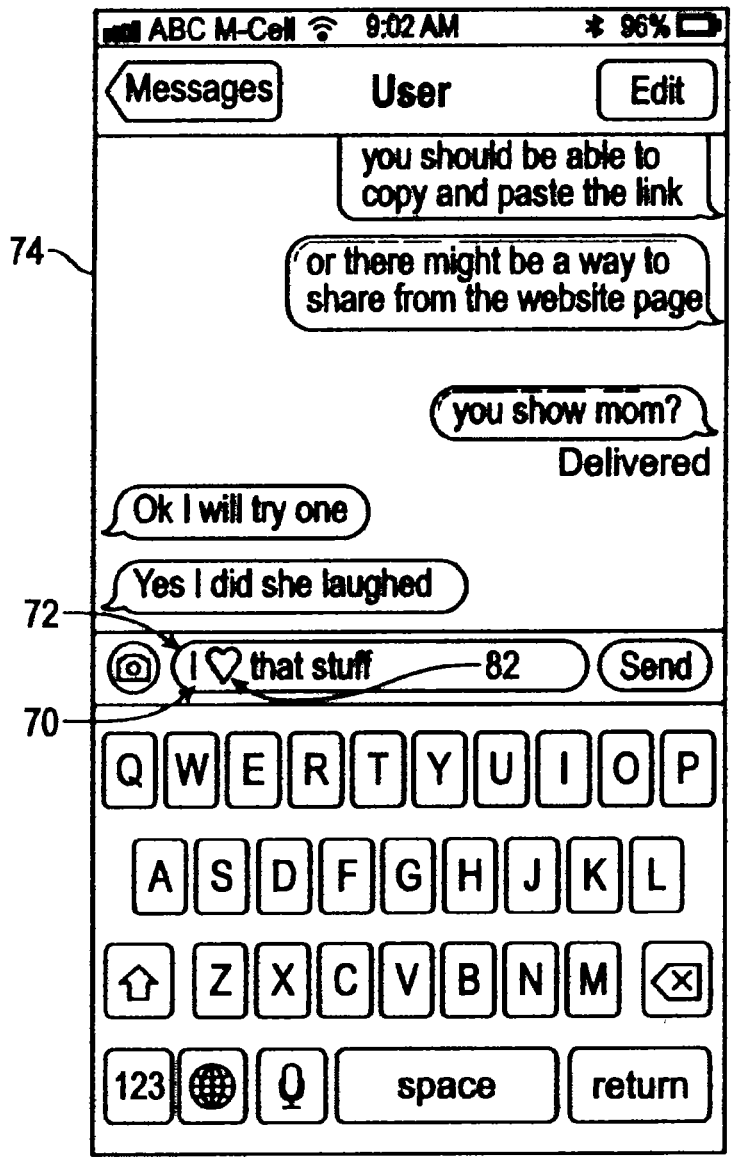
Figures 3, 4:
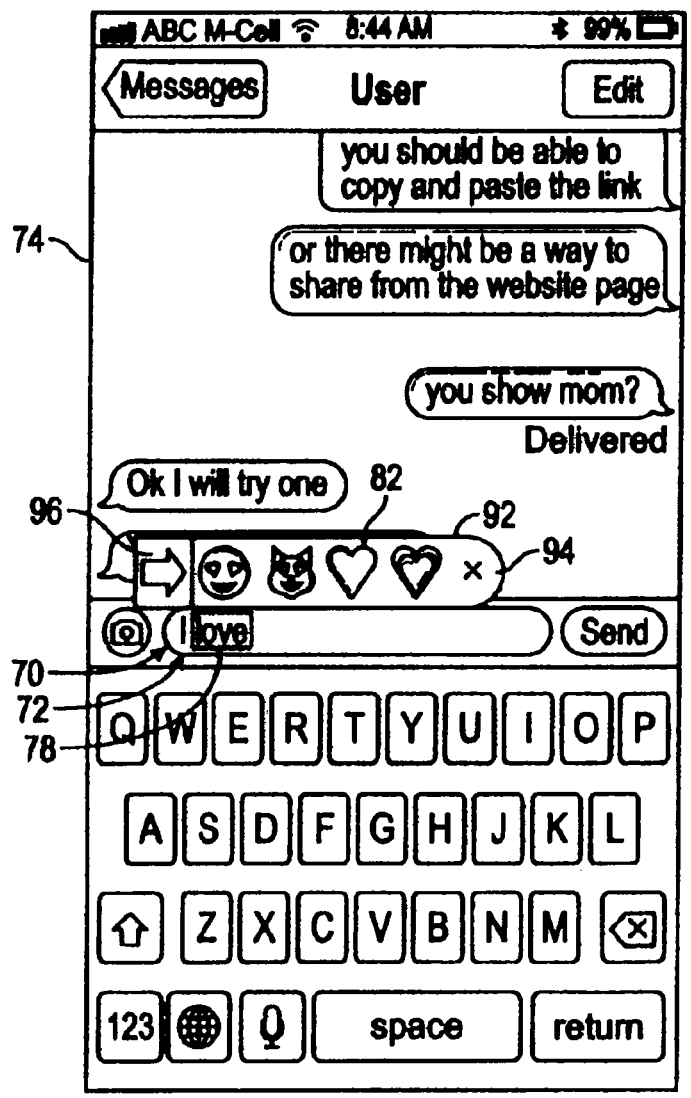
Figure 4:
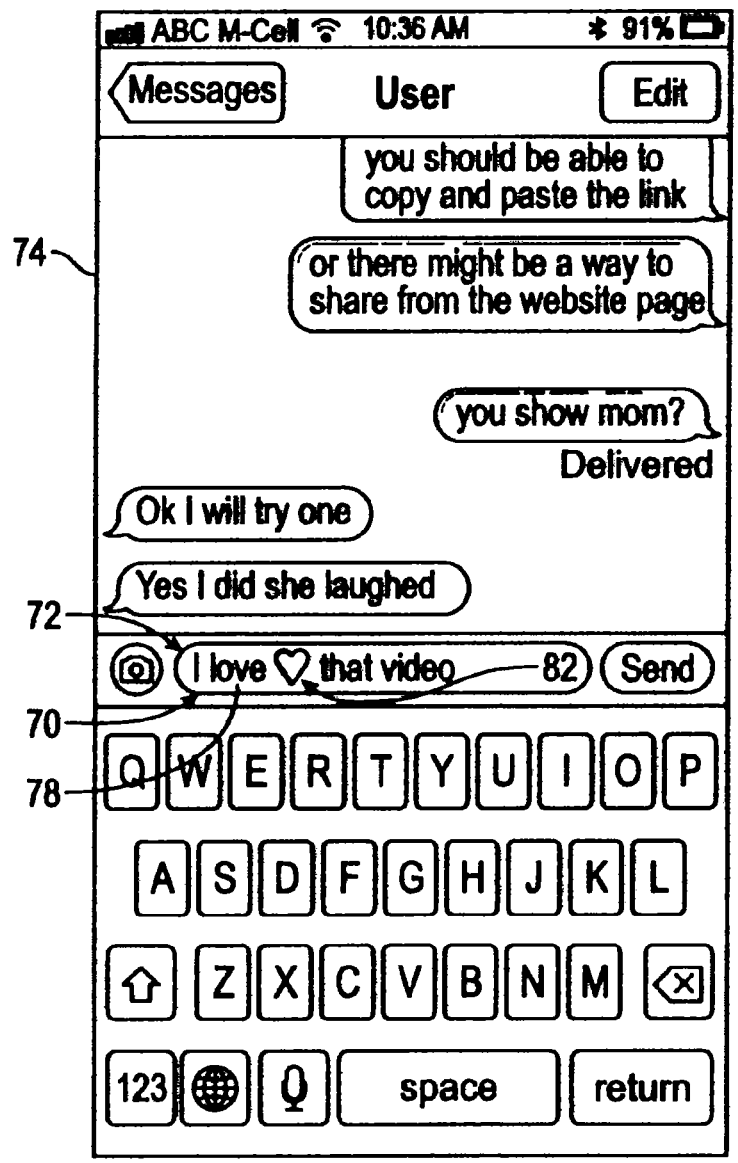

In some embodiments, after displaying the one or more ideograph 82, the processor 34 may enable selection of the one or more ideograph 82 via the input device 38. Selection of the one or more ideograph 82 may then insert the one or more ideograph 82 into the application data 70, for example the text 72 or the text stream. In some embodiments, as shown in FIGS. 4-1-4-2 and 4-7-4-8, insertion of the one or more ideograph 82 into the text stream may replace the one or more indicator 78 with the one or more ideograph 82 within the text 72 or text stream. In other embodiments, as shown in FIGS. 4-3-4-4, insertion of the one or more ideograph 82 into the text stream may insert the one or more ideograph 82 into the text stream in sequence after the one or more indicator 78. In this embodiment, the user may be presented with the option to select an insertion icon 96 indicating desired placement of the one or more ideograph 82 after the one or more indicator 78. In yet another embodiment, shown in FIGS. 4-5-4-6, inserting the one or more ideograph 82 may append the one or more ideograph 82 at the end of the text stream. In this embodiment, the insertion icon 96 may be selected in an alternative manner to the above embodiment to indicate a desired position at the end of the text stream for the one or more ideograph 82. For example, the user may select the shift key 98 causing the insertion icon 96 to be highlighted to indicate that the one or more ideograph 82 when selected will be appended to the end of the text stream.

In some embodiments, the processor 34 may enable insertion of the one or more ideograph 82 in multiple of the methods discussed above, and differ the method of insertion of the one or more ideograph 82 based on input from the user via the input device 38. For example, in some embodiments, the one or more ideograph 82 may replace the one or more indicator 78 by a gesture on a touch screen, double clicking the one or more indicator 78, or pressing a key. In other embodiments, the one or more ideograph 82 may be inserted after the one or more indicator 78 or appended to the end of the text stream via user input, such as one or more gestures on a touch screen, one or more key strokes on a keyboard, or interaction with the insertion icon shown in FIGS. 4-3 and 4-5. For example, the user may be presented with the pop-up window 92 having the insertion icon 96. When the user selects one of the one or more ideograph 82 presented in the pop-up window 92 without selecting the insertion icon 96, the processor 34 may replace the one or more indicator 78 with the selected one or more ideograph 82. When the user selects the insertion icon 96, the processor 34 may insert the selected one or more ideograph 82 after the one or more indicator 78, as described above. Finally, when the user selects the insertion icon 96, for example by a double tap or additional selection of the shift key 98, the processor 34 may append the selected one or more ideograph 82 to the end of the text stream.

As shown in FIGS. 4-7 and 4-8, and similar to the ideograph insertion described above, where the one or more ideograph 82 is a sticker, animation, or other media not traditionally included inline in text streams, the processor 34 may, upon selection by the user, insert the sticker, animation, or other media into the conversation without inserting the one or more ideograph 82 into the application data 70 currently being entered into the application. For example, as shown, the processor 34 may display the sticker and replace the application data 70 with the sticker to be transmitted to another user device, and thereby inserted into an ongoing conversation in the application 74 between the user device 14 and another user device.

Figures 4, 5:
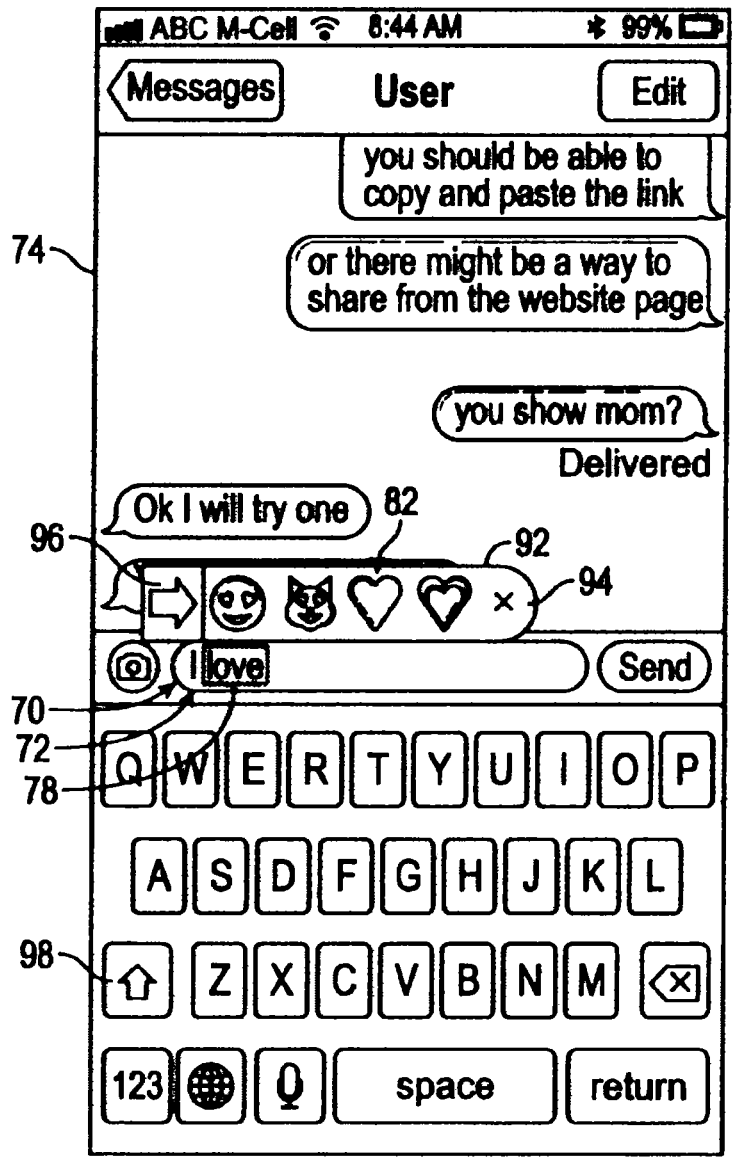

Referring now to FIG. 5 and FIGS. 6-1-6-8, shown in FIG. 5 is a block diagram of some embodiments of the word recognition and advertising insertion program 44-2. Similar to the word recognition and ideograph insertion program 44-1 and the word recognition and ideograph insertion program 46-1, the word recognition and advertising insertion program 44-2 may be implemented in whole or in part on the non-transitory processor readable medium 20 in the computer system 12 or in whole or in part on the non-transitory processor readable medium 36 of the user device 14. In one embodiment, when executed, the word recognition and advertising insertion program 44-2 may cause the one or more processor 18 to receive one or more branded visual content 100 from one or more advertiser 102, as indicated by block 104. The word recognition and advertising insertion program 44-2 may further cause the processor 18 to monitor application data 106 from the user device 14 via the communications network 16, as indicated by block 108. The processor 18 may then analyze the application data 106 for one or more indicator 110 within the application data 106, as indicated by block 112. The processor 18 may then select and retrieve one or more selected branded visual content 114, of the one or more branded visual content 100, indicative of a graphical representation of the one or more indicator 110 or one or more meaning of the one or more indicator 110, as indicated by block 116. The processor may then transmit the one or more selected branded visual content 114 to the user device 14 via the communications network 16, as indicated by block 118.

The one or more branded visual content 100 may be advertising branded iconic visual content such as licensed images, product icons, advertising icons, slogans, trademarks, and/or other branded content, for example. In some embodiments, for example, the one or more branded content 100 may be representative of a word, meaning, company, product, idea, slogan, political candidate, or the like which an entity may wish to advertise or disseminate to the public. Further, the branded visual content 100 may be implemented as emoticons, emoji, stickers, video, .gif, other media, and/or combinations thereof. For example, as shown in FIGS. 6-1-6-8, the branded visual content 100 may be digital stickers containing trademarked images, names, and phrases.

The one or more advertiser 102 may be organizations, companies, candidates seeking political office, non-profit organizations, partnerships, individuals, governmental entities, and/or other groups or individuals seeking to bring consumer product messages and other messages into social media and mobile apps in a seemingly natural and user-friendly manner. For example, advertisers may be individuals or companies seeking to reach users in an engaging and cooperative way so their brand or product stands out, or becomes connected to a given activity, idea, or conveyed message.

As indicated by block 104, the word recognition and ideograph or in-app advertising system 10-1, and thereby the word recognition and advertisement insertion program 44-2, receives the one or more branded visual content 100 from the one or more advertiser 102. The one or more advertiser 102 may provide the word recognition and ideograph or in-app advertising system 10-1 with the one or more branded visual content 100 by signing up for the word recognition and ideograph or in-app advertising system 10-1 through a subscribe platform, for example hosted by or stored on the non-transitory processor readable medium 20 of the computer system 12.

In one embodiment, the one or more advertiser 102 may register with the word recognition and ideograph or in-app advertising system 10-1 via a website or other registration function or mechanism in order to provide the one or more branded visual content 100 to the word recognition and ideograph or in-app advertising system 10-1. After registration with the word recognition and ideograph or in-app advertising system 10-1, the one or more advertiser 102 may provide the word recognition and ideograph or in-app advertising system 10-1 with a list of targeted keywords, phrases, and/or targeted uses, for example through a website or other registration function or mechanism. The one or more advertiser 102 may then provide the one or more branded visual content 100 or allow the word recognition and ideograph or in-app advertising system 10-1 to provide the one or more branded visual content 100. In some embodiments, the word recognition and ideograph or in-app advertising system 10-1 may provide the one or more branded visual content 100 for a fee after an agreement has been reached by the one or more advertiser 102 and a representative of the word recognition and ideograph or in-app advertising system 10-1. In some embodiments, so long as the one or more advertiser 102 is registered with the word recognition and ideograph or in-app advertising system 10-1, the one or more branded visual content 100 of the one or more advertiser 102 may continue to be selected and transmitted to the user devices 14 through selected messaging platforms or programs stored on the user device 14. In some embodiments, the selected messaging platforms or programs may have opted in or made an agreement to participate in the word recognition and ideograph or in-app advertising system 10-1 to provide users of user devices 14 with the one or more branded visual content 100.

The one or more advertiser 102, registering with the word recognition and ideograph or in-app advertising system 10-1, may enter into an advertising purchasing agreement for the word recognition and ideograph or in-app advertising system 10-1 based on a bidding function, exclusive advertising position, or other advertisement purchasing agreement. For example, as will be explained in more detail below, the one or more branded visual content 100 may be presented to the user as a single image or sticker, or may be presented to the user in a group of images or stickers. In this embodiment, when the one or more advertiser 102 pays for an exclusive advertising position, the one or more branded visual content 100 of the one or more advertiser may be presented as the single image or sticker. Where the one or more advertiser 102 pays for non-exclusive presentation, such as a bidding function, the one or more branded visual content 100 of the one or more advertiser 102 may be presented within a group of images or stickers with the placement of the one or more branded visual content 100 in the group of images or stickers based on a bid placed by the one or more advertiser 102, where the highest bid places the one or more branded visual content 100 at the first choice of the group of images presented to the user.

After registering with the word recognition and ideograph or in-app advertising system 10-1, the one or more advertiser 102 may be required to pay for display and insertion of the one or more branded visual content 100, as referenced above. The word recognition and ideograph or in-app advertising system 10-1 may include an accounting module which is configured to read the data, receive and process credit card information and other forms of payment, send invoicing and bill, and perform other accounting and billing functions. In some embodiments, when a messaging platform implements the functionality of the word recognition and advertising insertion program 44-2, the one or more advertiser 102 may be charged a one-time advertising/sponsorship fee. In this embodiment, the messaging platform may receive the one-time fee from each of the one or more advertiser 102 using the word recognition and ideograph or in-app advertising system 10-1 and sponsoring branded visual content 100. The one or more advertisers 102, in some embodiments, may also be charged a processing fee in relation to continued registration and/or use of the word recognition and ideograph or in-app advertising system 10-1 and/or access to the messaging platforms using the word recognition and ideograph or in-app advertising system 10-1. The one or more advertiser 102 may also be charged based on a cost per use, cost per thousand, or other advertising billing method, by the messaging platform and/or the word recognition and ideograph or in-app advertising system 10-1. For example, the one or more advertiser 102 may be charged, under the cost per use model, each time a user selects one of the one or more branded visual content 100 associated with that advertiser 100 and transmits that branded visual content 100 to another user. Under the cost per thousand model, the one or more advertiser 102 may be charged based on the number of times the one or more branded visual content 100 associated with that advertiser 102 is displayed to the user, for example a fee for each thousand times that one or any of the one or more branded visual content 100 is displayed. In some embodiments, the revenue generated from the one or more advertiser 102 may be divided between the word recognition and ideograph or in-app advertising system 10-1 and the messaging platform implementing the word recognition and ideograph or in-app advertising system 10-1.

The processor 18 may monitor the application data 106 from the user device 14 similarly to the manner described with reference to the application data 50 as described above. Further, the processor 18 may analyze the application data 106 for the one or more indicator 110 in a similar manner to that described in regards to the application data 50 and the one or more indicator 52. In some embodiments, the messaging platform used by the user device 14 for the application data 106 may utilize an API and/or SDK of the word recognition and ideograph or in-app advertising system 10-1. As such the word recognition and advertising insertion program 44-2 may filter the application data 106 to decipher and identify the one or more indicator 110, such as keywords, key phrases, contextual meanings, and other indicators 110. As shown in FIGS. 6-1, 6-3, 6-5, and 6-7, in some embodiments, the processor 18 may highlight the one or more indicator 110 within the application data 106 to indicate to the user that the one or more indicator has one or more branded visual content 100 which may graphically represent the one or more indicator 110.

Figures 4, 5, 6:
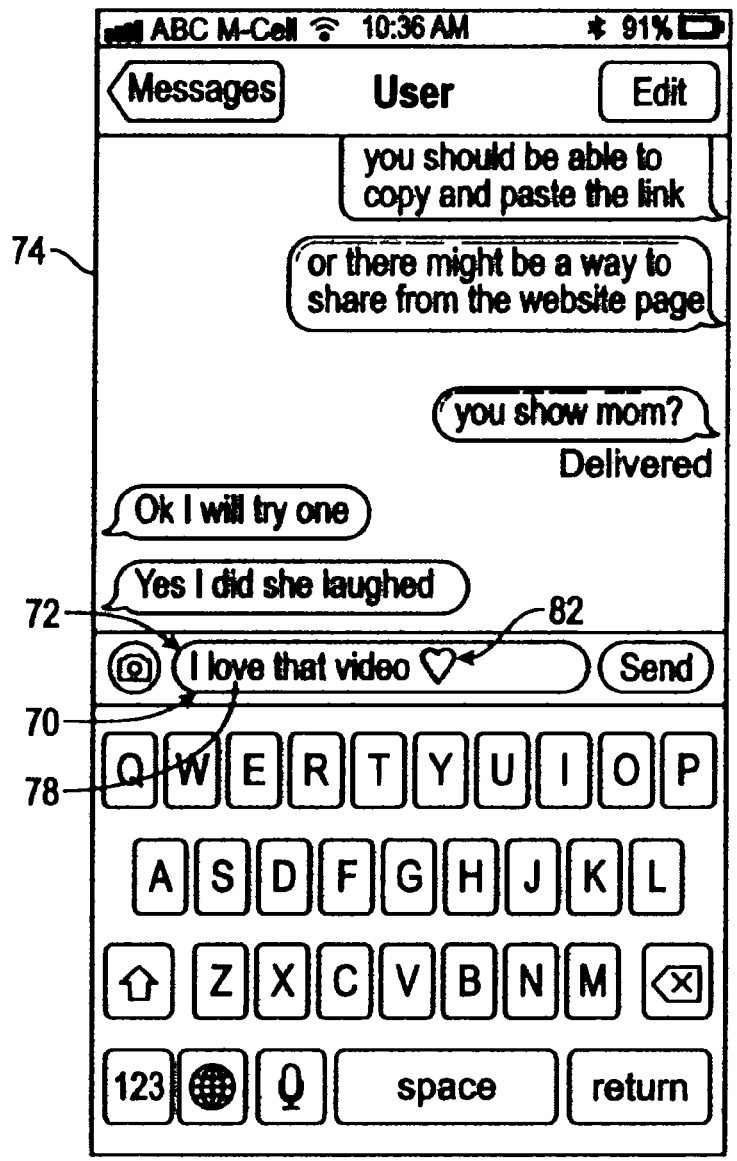

The processor 18 may select and retrieve the one or more selected branded visual content 114 of the one or more branded visual content 100. The one or more selected branded visual content 114 may be indicative of a graphical representation of the one or more indicator 110 or one or more meaning of the one or more indicator 110 as described above. In some embodiments, the processor 18 may select the one or more selected branded visual content 114 with selection criteria, in part, based on the agreement under which the one or more advertiser 102 uses the word recognition and ideograph or in-app advertising system 10-1. As referenced above, where the messaging platform on the user device 14 implements the API and/or SDK of the word recognition and ideograph or in-app advertising system program 10-1, the word recognition and advertising insertion program 44-2 may automatically search to one or more branded visual content 100 of the one or more advertisers 102 stored in the word recognition and ideograph or in-app advertising system 10-1, for example stored on the non-transitory processor readable medium 20. By way of illustration, if a match between the one or more indicator 110, such as user generated keywords, and keywords associated with one or more of the branded visual content 100 is found, the processor 18 may select the branded visual content 100 associated with those keywords and retrieve that branded visual content 100 for distribution to the user device 14. For example, when a user types the word coffee, into the application data 106, as shown in FIGS. 6-1, 6-3, 6-5, and 6-7, the processor 18, running the word recognition and advertising insertion program 44-2, may identify "coffee" as the one or more indicator 110 and return selected branded visual content 114 including graphics of a cup of coffee branded with the STARBUCKS® logo and a cup of coffee branded with the DUNKIN DONUTS® logo, as shown in FIG. 6-6. In some embodiments, as shown in FIGS. 6-4 and 6-6, as will be discussed in more detail below, where the one or more indicator 110 are related to a plurality of the branded visual content 100, the user device 14 may receive a set of choices, including all or some of the related plurality of selected branded visual content 114. The user may then select a desired one or more of the one or more selected branded visual content 114 for insertion into the application data 106.

In some embodiments, with regard to presenting the selected branded visual content 114 to the user on the user device 14, as shown in FIGS. 6-1 and 6-2, the one or more selected branded visual content 114 may be delivered in a single digital sticker implementation 120. In these embodiments, the digital sticker, a single selected branded visual content 122, may be displayed on the user device 14 peeking out from behind a chat bar as a selectable icon, such that a portion of the digital sticker may be obscured by the chat bar. In other embodiments a plurality of selected branded visual content 114 may be presented in a group of selectable icons, a portion of which may be hidden behind the chat bar, similar to that shown in FIG. 4-1. In some embodiments, as previously described, where the plurality of selected branded visual content 114 is presented as peeking from the chat bar, the selected branded visual content 114 associated with the advertiser 102 with the highest bid may be placed first in the group. In the embodiments with the single digital sticker implementation 120, the word recognition and advertising insertion program 44-2 may enable the user to select one of the selected branded visual content 122, at which time the selected branded visual content 122 may be inserted into the user's application data 106, such as a text message conversation. In some embodiments, as shown in FIG. 6-2, when the user taps the selected branded visual content 122, the selected branded visual content 122 may be appended to the user's application data 106, appearing after or below the application data 106. The user may also swipe the one or more selected branded visual content 114, removing from the output device 40, such as a display, and thereby rejecting the one or more selected branded visual content 114. In some embodiments, the user may use other gestures or methods, such as an "x" icon on the sticker, to reject the one or more selected branded visual content 114.

In some embodiments, the one or more selected branded visual content 114 may be delivered in a digital sticker set implementation 124, as shown in FIGS. 6-3 and 6-4. In these embodiments, the word recognition and advertising insertion program 44-2 may present the one or more branded visual content 114 as one or more digital sticker icon 126 appearing proximate to the chat bar, without a portion hidden behind the chat bar. The digital sticker icon 126 may be the selected branded visual content 114, or may be a different icon indicating the presence of an option to select branded visual content 100 that can be enabled upon user selection. The presentation of the one or more digital sticker icon 126 may inform the user that there are branded visual content 114 selections available, from a sponsored digital sticker set 128, matching and/or representing one or more of the indicators 110. A single digital sticker icon 126 may be shown for each sponsored digital sticker set 128. Upon selection of the digital sticker icon 126, in some embodiments, the output 40 of the user device 14 may display a popover view showing the entire digital sticker set 128, all of the branded visual content 100, from the advertiser 102 to which the digital sticker set 128 is ascribed. In some embodiments, the digital sticker set 128 may be shown within the messing platform proximate to the application data 106, or in any other suitable manner. For example, as shown in FIG. 6-4, a plurality of branded visual content 100-1-100-8 may be displayed within a chat body within the messaging platform on the user device 14, where each of the plurality of branded visual content 100-1-100-8 are STARBUCKS® branded icons. The user may then choose one or more of the branded visual content 100, without regard to its specific selection by the word recognition and advertising insertion program 44-2. Selecting one of the one or more branded visual content 100 from the digital sticker set may insert the selected branded visual content 114 into the application data 106. If multiple digital sticker sets 128 from a plurality of the one or more advertisers 102 is representative of the one or more indicator 110 of the application data 106, the advertiser 102 with the highest bid may receive the highest priority for insertion, with that advertiser's 102 digital sticker set 128 displayed first.

In some embodiments, the one or more selected branded visual content 114 may be delivered in a multiple advertiser implementation 130, as shown in FIGS. 6-5 and 6-6. Similar to the digital sticker set 128 implementation, the multiple advertiser 130 implementation may enable the processor 18 to identify the one or more indicator 110, keywords and/or phrases, within the application data 106 which relate to the branded visual content 100 in a plurality of sponsored digital sticker sets 132 for a plurality of advertisers 102. The word recognition and advertising insertion program 44-2 may display to the user a single digital sticker icon 134 representative of the digital sticker sets 132 with branded visual content 100 relating to the one or more indicator 110. In some embodiments, the plurality of advertisers 102, the digital sticker sets 132, and/or the branded visual content 100 within the digital sticker sets 132 may be ordered based on bidding of the plurality of advertisers 102 or other methods. In embodiments where the order of digital sticker sets 132 is based on bidding, the digital sticker sets 132 may be organized such that the digital sticker set 132 of a highest bidding advertiser 102 of the plurality of advertisers 102 appears first or in an otherwise prominent location. Upon selection of the digital sticker icon 134, the word recognition and advertising insertion program 44-2 may cause the user device 14 to display a menu with all of the digital sticker sets 132, with branded visual content 100 related to the one or more indicator 100, from the plurality of advertisers 102. The user may then select the branded visual content 100 for insertion into the application data 106 from the collected portfolio of the digital sticker sets 132 displayed. In some embodiments, the advertiser 102 associated with the branded visual content 100, selected from the portfolio of digital sticker sets 132, may be billed at a cost per use rate. The other advertisers 102 whose branded visual content 100 was displayed within the portfolio of digital sticker sets may be billed at a cost per thousand rate. In this manner, a monetization model may apply a premium charge for branded visual content 100 delivered to and ultimately selected by the user. In this embodiment, a conventional charge, cost per thousand, may be charged to advertisers 102 based on the rate at which the branded visual content 100 of the advertisers 102 are displayed for the user, but not selected.

Figures 4, 5, 6, 7:
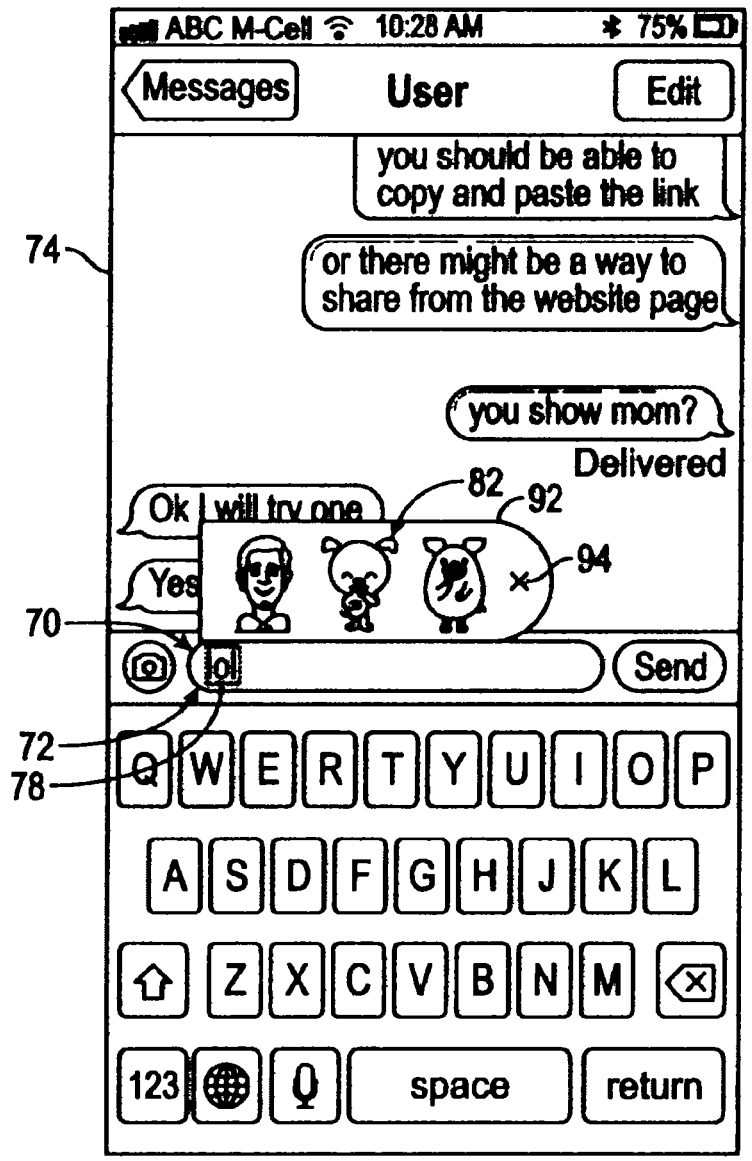
Figures 4, 5, 6, 7, 8:
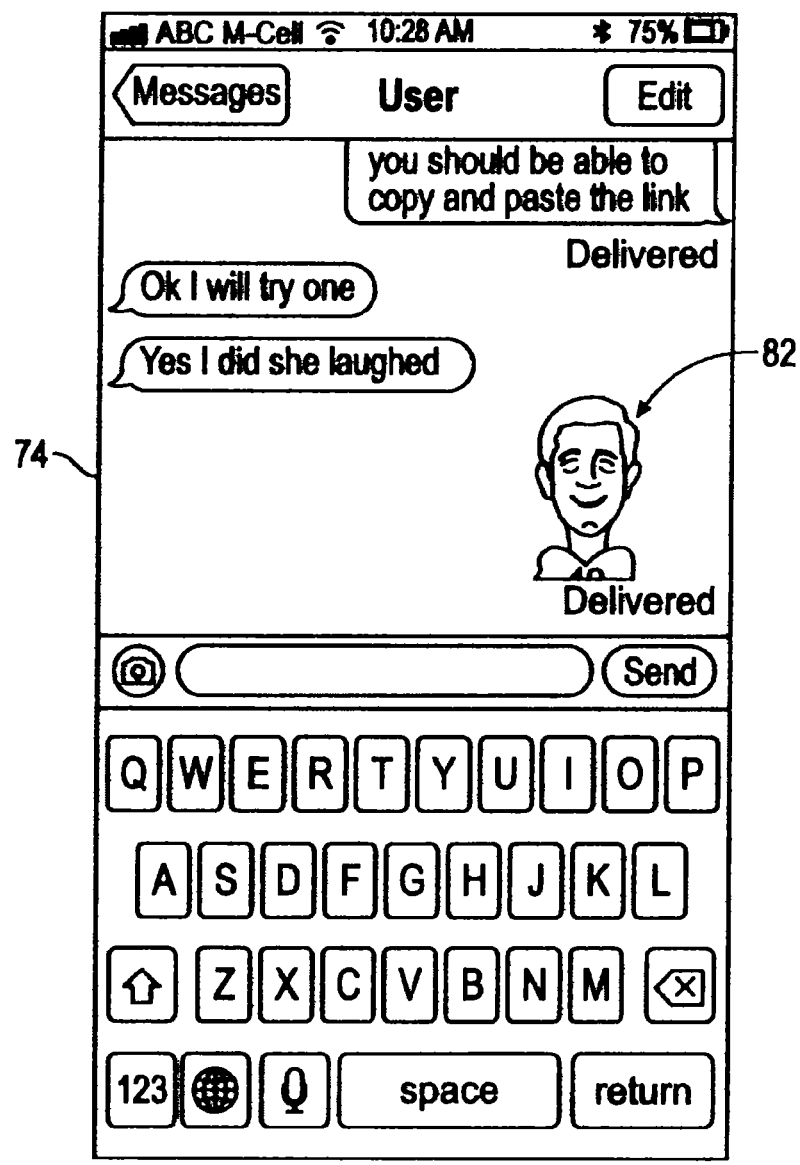
Figure 5:
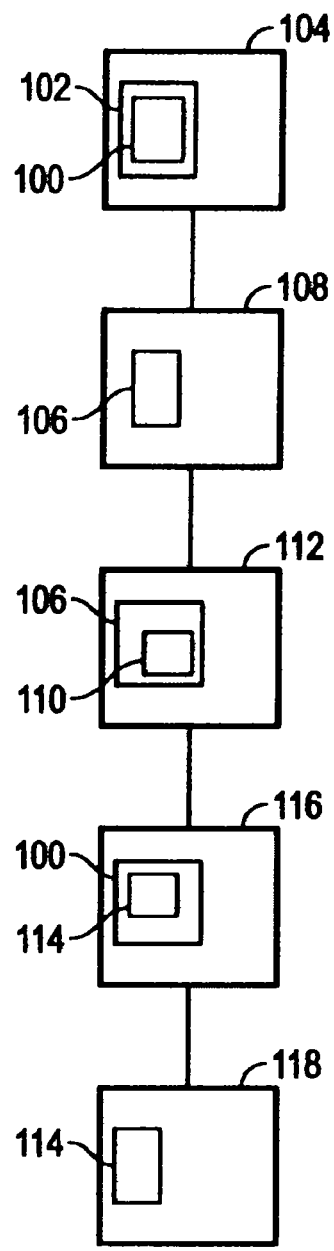
Figures 1, 6:
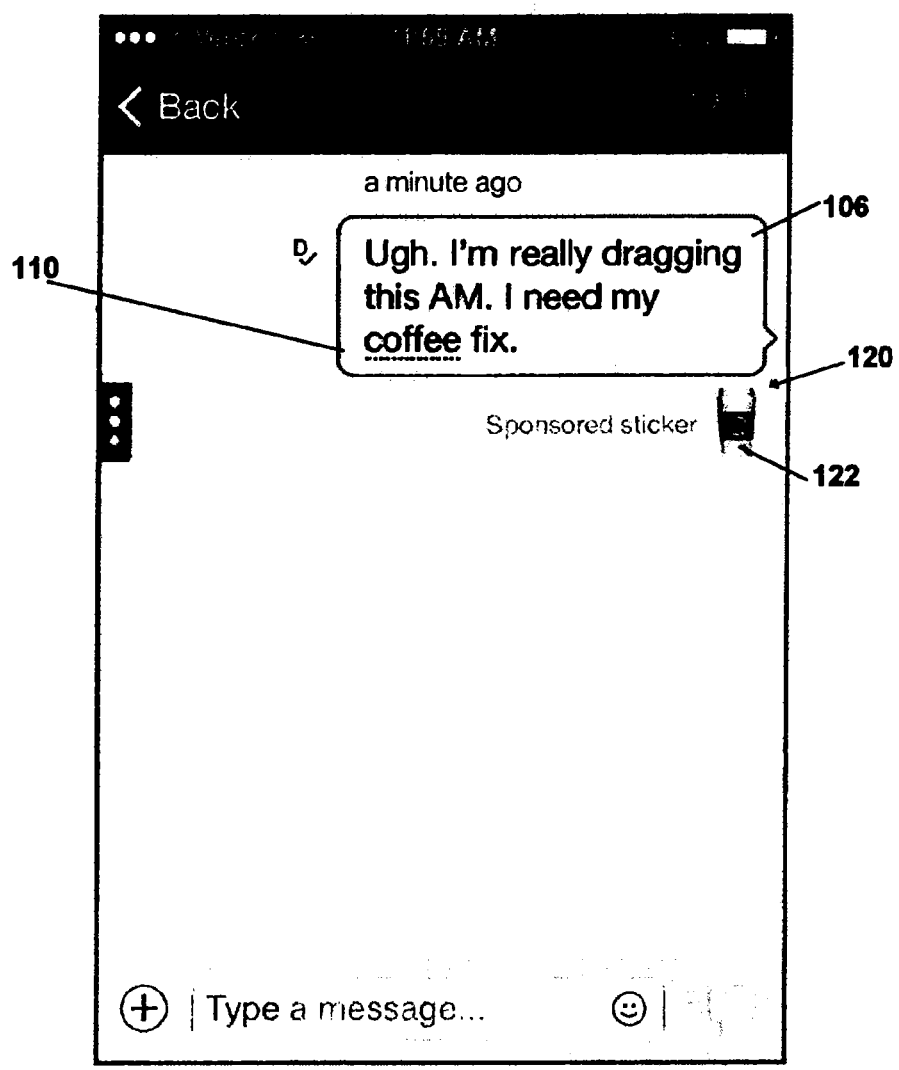
Figures 2, 6:
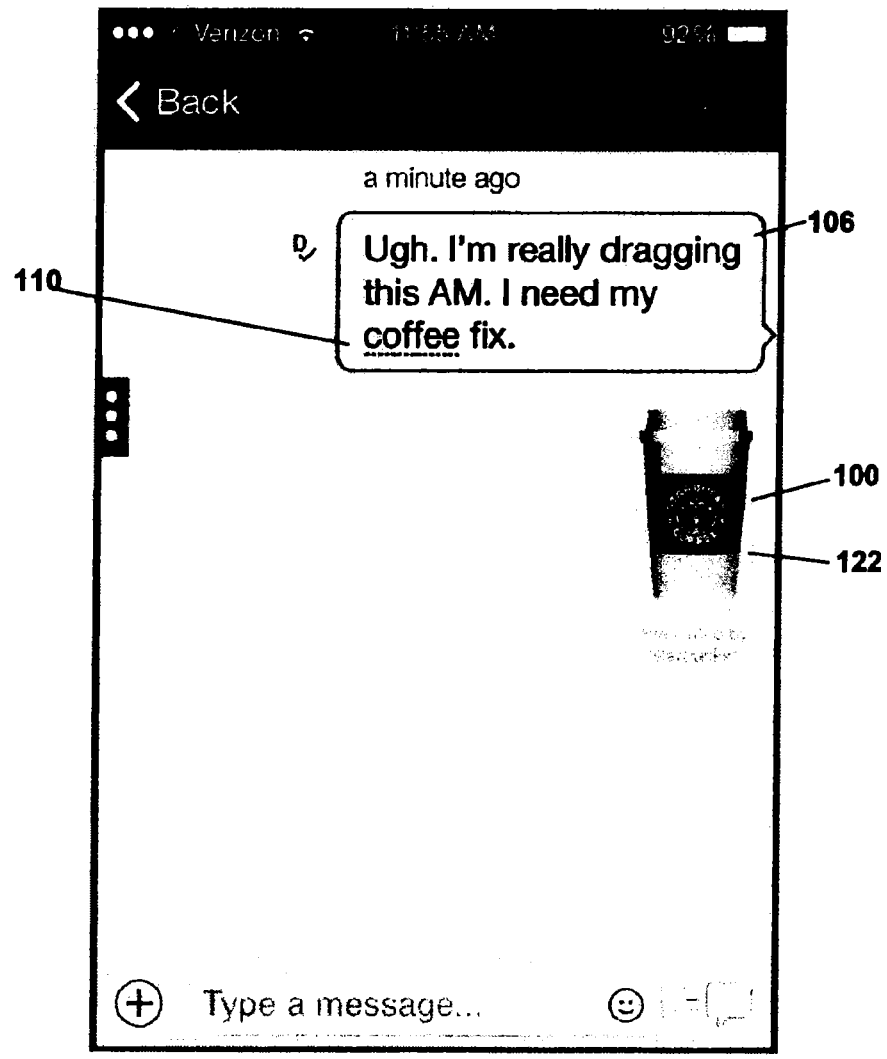
Figures 3, 6:
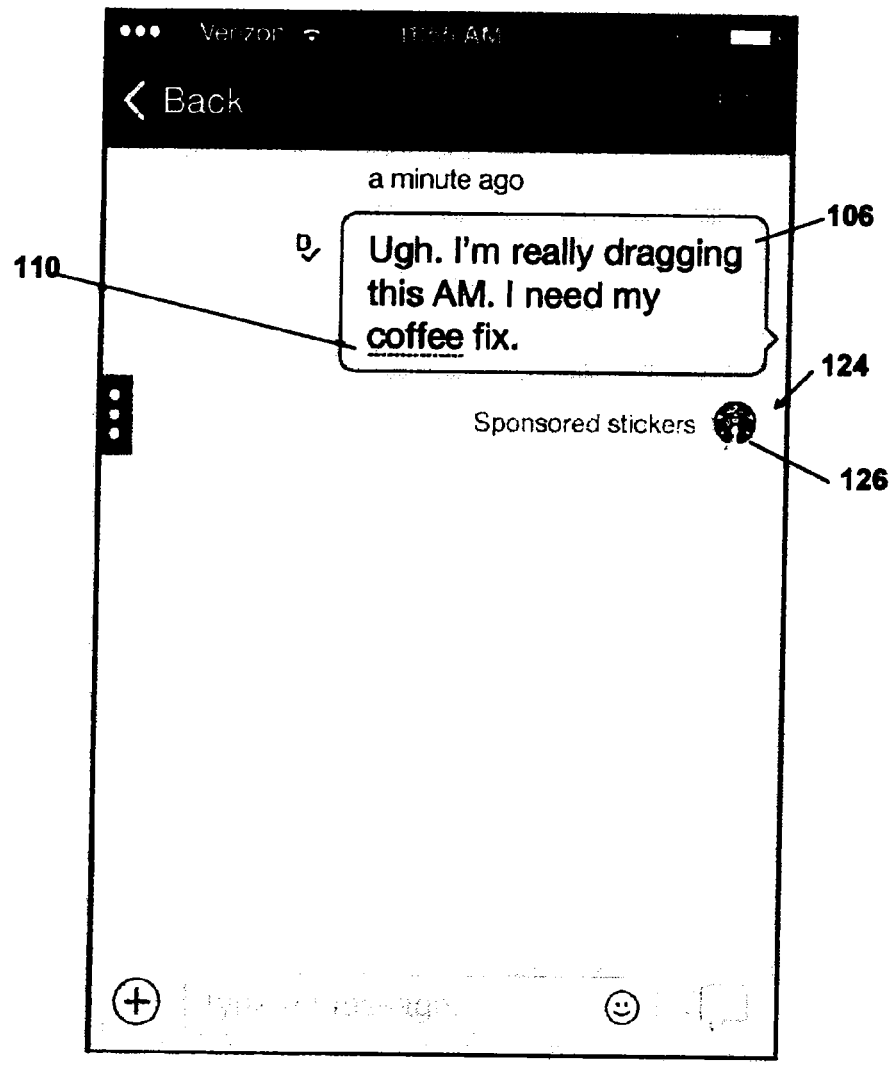
Figures 4, 6:
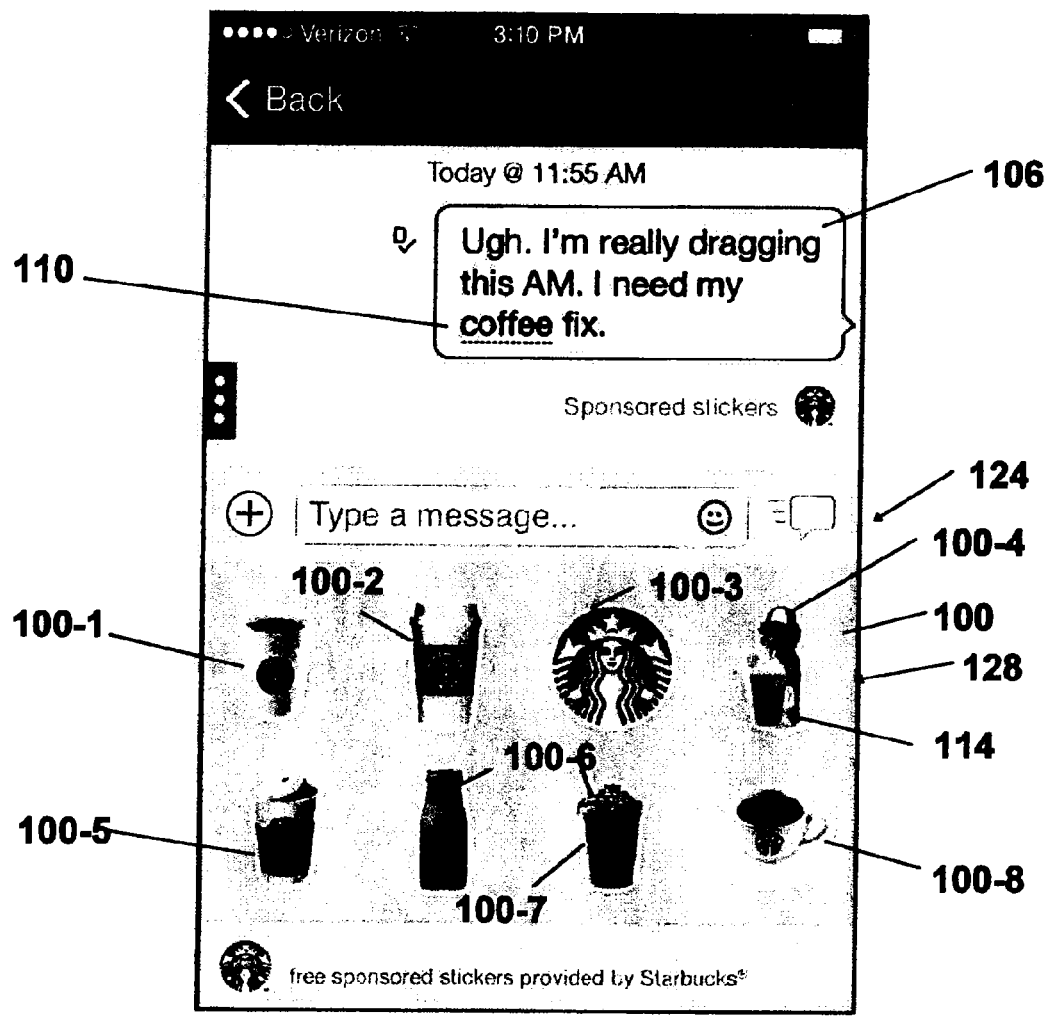
Figures 5, 6:
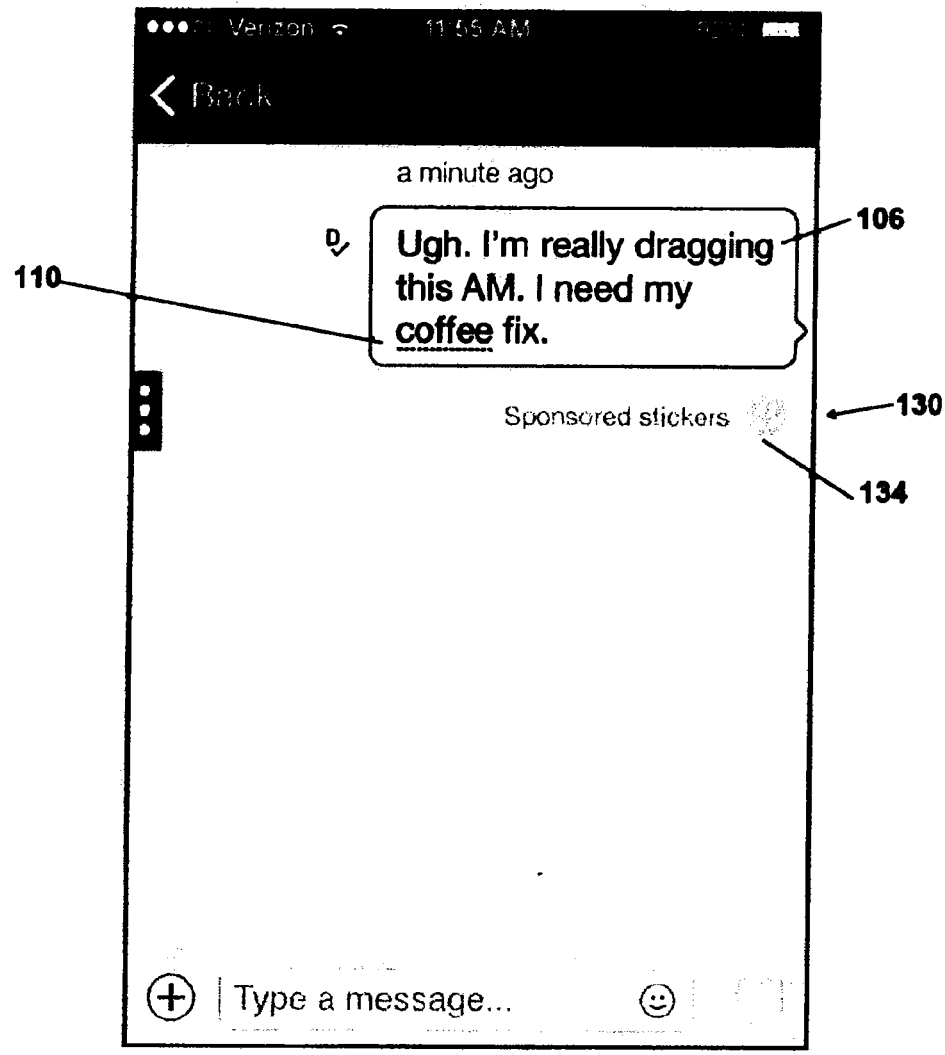
Figure 6:
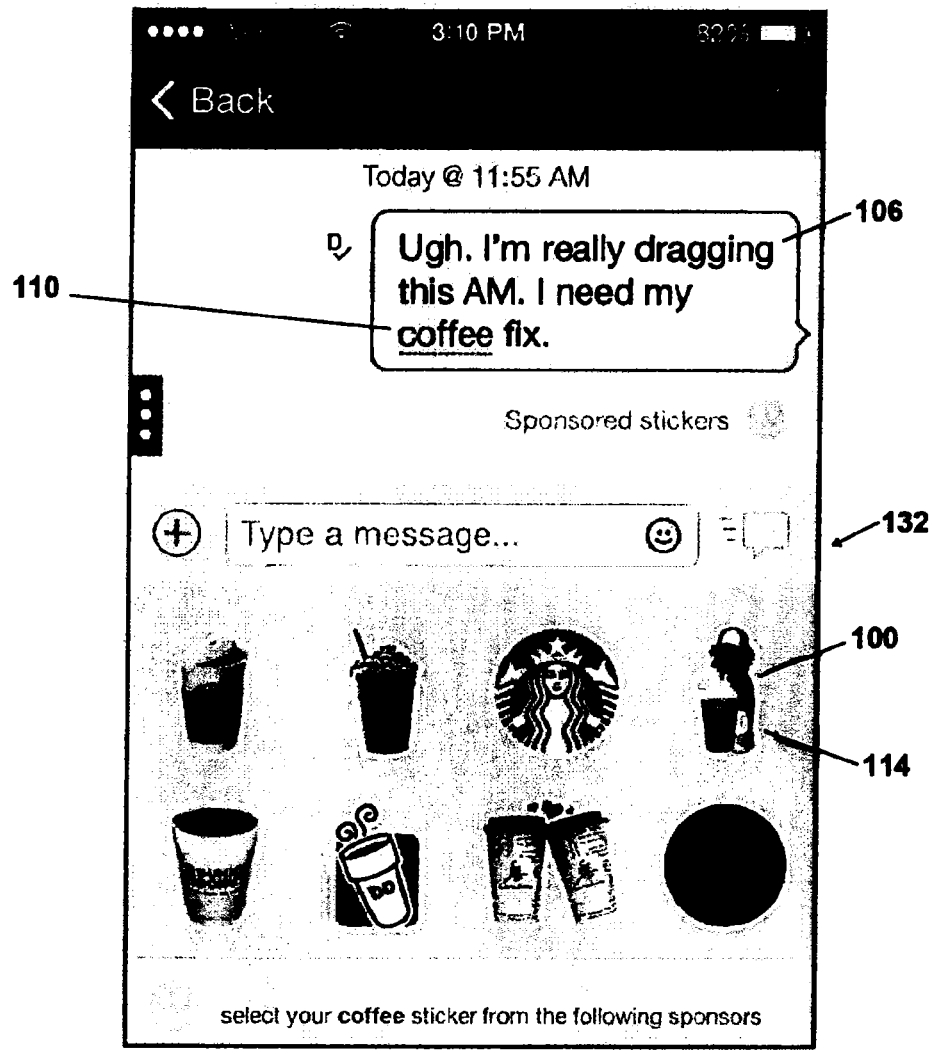
Figures 6, 7:
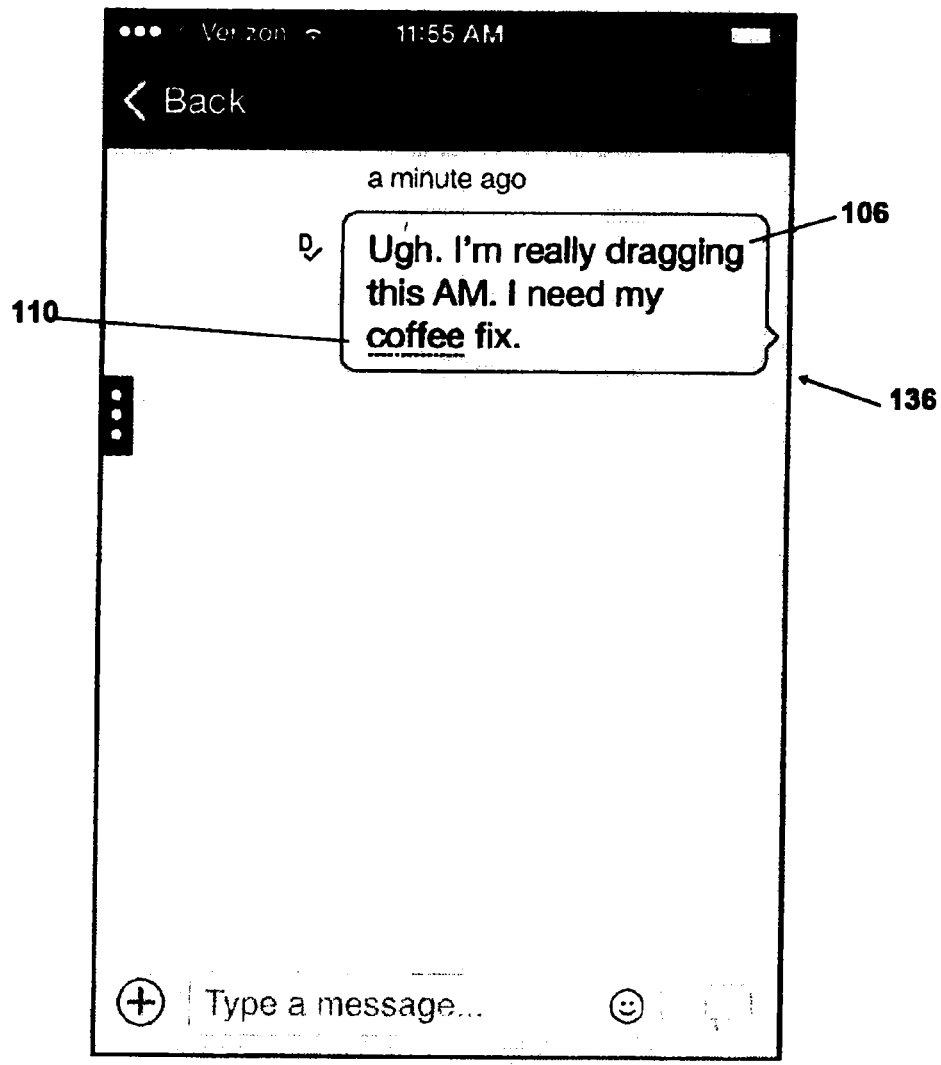
Figures 6, 7, 8:
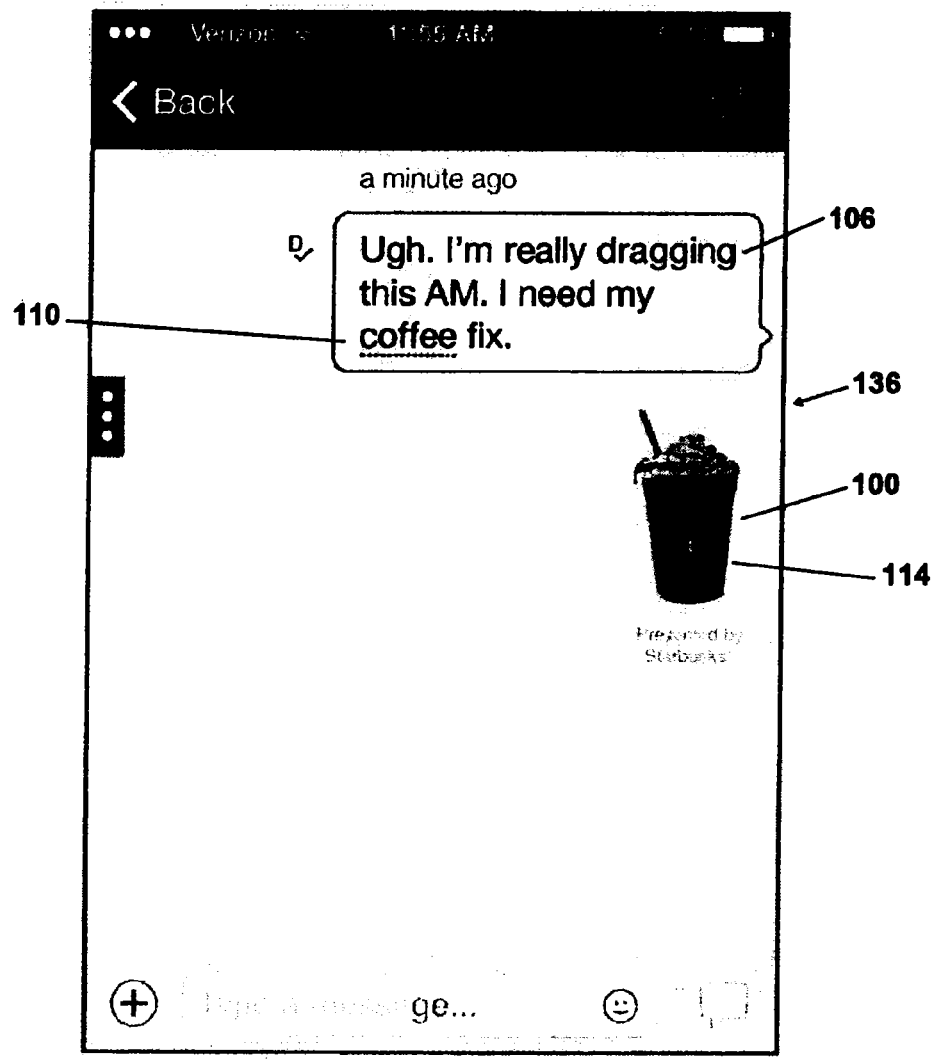

In some embodiments, as shown in FIGS. 6-7 and 6-8, the one or more selected branded visual content 114 may be delivered in a pushed digital sticker 136 implementation. In embodiments with a pushed digital sticker 136 implementation, the word recognition and advertising insertion program 44-2 may enable the user device 14 to automatically insert, push, the selected branded visual content 114 into the application data 106 on a keyword or key phrase contextual basis, by accessing and using targeted profile information about a user to display relevant selected branded visual content 114, or other methods, for example. In these embodiments, the user device 14 may insert or push the selected branded visual content 114 into the application data 106 without user interaction. The selected branded visual content 114 may also be appended to the application data 106 appearing after or below the application data 106 as shown in FIG. 6-8. The word recognition and advertising insertion program 44-2 may allow for the user device 14 or messaging platform running on the user device 14 to have predetermined or selectable controls for when and/or how often selected branded visual content 114 may be pushed or automatically inserted into or appended to the application data 106. For example, each time there is a match for one or more indicators 110 within the application data 106 the selected branded visual content 114 may be inserted, as shown in FIG. 6-8. In other embodiments, after a certain number of messages have been sent using a messaging platform or at predetermined time intervals, the word recognition and advertising insertion program 44-2 may enable a selected branded visual content 114 to be pushed into the application data 106. In other embodiments, the word recognition and advertising insertion program 44-2 may enable pushing an unrelated branded visual content 110 into the application data 106 of a communication between two users or to the messaging platform of the user based on user criteria. For example, user criteria may include age, location, gender, device or operating system, purchasing habits, prior selected branded visual content 114, or other user specific criteria. The frequency of pushing unrelated branded visual content 110 to the user or into the user's application data 106 may be controlled by the word recognition and advertising insertion program 44-2, by settings on the user device 14, or by the user, for example.

In any event, once the selected branded visual content 114 is delivered to the user, the user device 14 or the messaging platform from which the user chose the selected branded visual content 114 may send the user's selection to the word recognition and advertising insertion program 44-2, such that the word recognition and advertising insertion program 44-2 may create a record of the selection, a record of billing reflecting that selection, and bill the advertiser on a cost per use, cost per thousand, or other agreed billing interval.

During and after transmission of the selected branded visual content 114 to the user device 14 and the selection or rejection of the selected branded visual content 114 by the user, the word recognition and ideograph or in-app advertising system 10-1 may also track information indicating how many times the branded visual content 100 of the one or more advertisers 102 are presented, used, and/or cycled through. The processor 18, running the word recognition and advertising insertion program 44-2, may store various values in the non-transitory processor readable medium 20 or other electronic storage media indicative of the number of times the one or more branded visual content 100 is transmitted and/or displayed to the user. The processor 18 may also store the number of times the one or more branded visual content 100 is selected and/or inserted into the application data 106 by the user. The information indicative of the display and/or selection of the one or more branded visual content 100 may be provided to the one or more advertiser 102. The word recognition and ideograph or in-app advertising system 10-1 and/or the messaging platform may also provide the one or more advertiser 102 with information on the amount of a budget of the one or more advertiser 102 which has been spent in a predetermined time period and total budgeted dollars remaining within the budget. Further, the word recognition and ideograph or in-app advertising system 10-1 and/or the messaging platform may provide the one or more advertiser 102 with information on the user profile of users who select and/or reject the selected branded visual content 114 of the one or more advertiser 102. For example, the one or more advertiser 102 may be provided with demographic information of users selecting the branded visual content 100 of the advertiser 102. The information in the user profile may be provided by the user to the messaging platform, the communications provider of the user, the user device 14, or other user information shared by the user or collected as part of routine business practices.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A non-transitory processor readable medium storing processor executable instructions that when executed by a processor cause the processor to:
   receive application data from a user device via a communications network, the application data being indicative of text entered into an application by a user via the user device;
   analyze the application data for one or more indicator, the one or more indicator being at least a portion of the text entered into the application, the one or more indicator having one or more meaning;
   retrieve one or more selected ideograph from a database populated with ideographs associated with one or more advertisers, the one or more selected ideograph being a graphical representation of the one or more indicator;
   transmit the one or more selected ideograph to the user device; and
   charge a fee to at least one advertiser associated with the one or more selected ideograph, wherein the one or more selected ideograph is retrieved and transmitted to the user device without immediate user action beyond entering the text into the application.

2. The non-transitory processor readable medium of claim 1, wherein the one or more ideograph is a pictorial representation of the one or more.

3. The non-transitory processor readable medium of claim 1, wherein the one or more ideograph is a non-textual graphic.

4. The non-transitory processor readable medium of claim 1, wherein the one or more ideograph is branded visual content.

5. The non-transitory processor readable medium of claim 1, wherein the processor executable instructions are a first application and the application receiving the application data is a messaging application.

6. The non-transitory processor readable medium of claim 1, wherein the processor executable instructions when executed by the processor cause the processor to receive a list of targeted keywords, phrases and/or targeted uses from the advertiser for use in retrieving an ideograph associated with the advertiser.

7. The non-transitory processor readable medium of claim 1, wherein the processor executable instructions when executed by the processor cause the processor to execute a bidding function in which the one or more selected ideograph is presented to the user of the user device based on a bid placed by the one or more advertiser.

8. The non-transitory processor readable medium of claim 7, wherein the bidding function causes the one or more selected ideograph associated with a highest priority to be transmitted to the user device.

9. The non-transitory processor readable medium of claim 1, wherein the one or more selected ideograph is received from one or more advertiser and stored on the non-transitory processor readable medium.

10. The non-transitory processor readable medium of claim 1, wherein the processor executable instructions when executed by the processor cause the processor to execute a registration function configured to register the one or more advertisers.

11. The non-transitory processor readable medium of claim 1, wherein the one or more selected ideograph is transmitted to a second user device via the communications network.

12. A non-transitory processor readable medium storing processor executable instructions that when executed by a processor cause the processor to:
    receive one or more branded visual content associated with one or more advertiser;
    receive application data from a user device via a communications network, the application data being entered into an application by a user via the user device;
    analyze the application data for one or more indicator having one or more meaning;
    select one or more selected branded visual content, of the one or more branded visual content, based upon the one or more indicator; and
    transmit the one or more selected branded visual content to the user device, wherein the processor executable instructions when executed by the processor cause the processor to charge a fee to an advertiser associated with the selected branded visual content transmitted to the user device.

13. The non-transitory processor readable medium of claim 12, wherein the one or more selected branded visual content is retrieved and transmitted without user action beyond entering the application data into the application.

14. The non-transitory processor readable medium of claim 12, wherein the processor executable instructions when executed by the processor cause the processor to execute a bidding function in which the one or more selected branded visual content is presented to a user of the user device based on a bid placed by the one or more advertiser.

15. The non-transitory processor readable medium of claim 14, wherein the bidding function causes the branded visual content associated with a highest bid to receive a highest priority for transmission to the user device.

16. The non-transitory processor readable medium of claim 12, wherein the one or more selected branded visual content is transmitted to a second user device via the communications network.

17. An ideograph insertion system, comprising:
- a processor configured to execute processor executable instructions;
- a communications device coupled to the processor and configured to transmit information from a computer network to the processor and transmit information from the processor to the computer network; and
- a non-transitory processor readable medium coupled to the processor and storing processor executable instructions that when executed cause the processor to:
  - receive application data from a user device via a communications network, the application data being entered into an application by a user via the user device;
  - analyze the application data for one or more indicator having one or more meaning;
  - retrieve one or more selected ideograph from a database populated with ideographs associated with one or more advertisers, the one or more selected ideograph being a graphical representation of the one or more meanings of the one or more indicator;
  - transmit the one or more selected ideograph to the user device; and
  - charge a fee to at least one advertiser associated with the one or more selected ideograph, wherein the one or more selected ideograph is retrieved and transmitted to the user device without immediate user action beyond entering the application data into the application.

18. The ideograph insertion system of claim 17, wherein the one or more selected ideograph is one or more selected branded visual content.

19. The ideograph insertion system of claim 18, wherein the one or more selected branded visual content is received from one or more advertiser and stored on the non-transitory processor readable medium.

20. The ideograph insertion system of claim 19, wherein the processor executable instructions when executed by the processor cause the processor to execute a bidding function in which the one or more selected branded visual content is presented to the user of the user device based on a bid placed by the one or more advertiser.

21. The ideograph insertion system of claim 20, wherein the processor executable instructions when executed by the processor cause the processor to retrieve the one or more selected ideograph based upon the one or more meanings of the one or more indicator and the bidding function.

22. The ideograph insertion system of claim 21, wherein the bidding function causes the one or more ideograph associated with a highest priority to be transmitted to the user device.

23. The ideograph insertion system of claim 17, wherein the one or more selected ideograph is transmitted to a second user device via the communications network.

* * * * *